(12) United States Patent
Korkiakoski et al.

(10) Patent No.: US 9,173,078 B2
(45) Date of Patent: Oct. 27, 2015

(54) MANAGEMENT OF MULTIPLE SUBSCRIBER IDENTITY MODULES

(71) Applicant: UROS OY, Oulu (FI)

(72) Inventors: Jari Korkiakoski, Oulu (FI); Tommi Uhari, Oulu (FI)

(73) Assignee: UROS TECHNOLOGY S.À.R.L., Ettelbruck (LU)

(*) Notice: Subject to any disclaimer, the term of this patent is extended or adjusted under 35 U.S.C. 154(b) by 54 days.

(21) Appl. No.: 13/855,255

(22) Filed: Apr. 2, 2013

(65) Prior Publication Data

US 2013/0288748 A1 Oct. 31, 2013

(30) Foreign Application Priority Data

Apr. 30, 2012 (EP) ..................................... 12166131

(51) Int. Cl.
| | | |
|---|---|---|
| *H04W 4/16* | (2009.01) | |
| *H04W 4/00* | (2009.01) | |
| *H04W 48/18* | (2009.01) | |
| *H04W 88/06* | (2009.01) | |
| *H04W 8/18* | (2009.01) | |

(52) U.S. Cl.
CPC ................ *H04W 4/16* (2013.01); *H04W 4/003* (2013.01); *H04W 8/183* (2013.01); *H04W 48/18* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2006/0172772 A1 | 8/2006 | Bjorkner | |
| 2009/0005041 A1 | 1/2009 | Steinberg et al. | |
| 2009/0131014 A1* | 5/2009 | Mashinsky et al. | 455/405 |
| 2009/0298480 A1* | 12/2009 | Khambete et al. | 455/414.1 |
| 2010/0240414 A1 | 9/2010 | Lotenberg | |
| 2010/0330986 A1* | 12/2010 | Rahman et al. | 455/432.1 |
| 2012/0207023 A1* | 8/2012 | Tsuda | 370/235 |

FOREIGN PATENT DOCUMENTS

| | | |
|---|---|---|
| DE | 198 23 074 A1 | 11/1999 |
| WO | WO 2008/045797 A2 | 4/2008 |

OTHER PUBLICATIONS

Sep. 17, 2012 Extended Search Report issued in European Application No. 12 16 6131.

* cited by examiner

*Primary Examiner* — Olumide T Ajibade Akonai
*Assistant Examiner* — Margaret G Mastrodonato
(74) *Attorney, Agent, or Firm* — Oliff PLC

(57) ABSTRACT

Management of multiple subscriber identity modules by server is disclosed. Instructions, when executed by one or more processors, cause a server, for a plurality of users of mobile terminals, to: cause an analysis on use of each subscriber identity module belonging to a set; cause a prediction of a future use of the each subscriber identity module belonging to the set on the basis of the analysis; cause a selection of at least one optimal subscriber identity module for use by the mobile terminal on the basis of the prediction such that the use of the subscriber identity modules is optimized for the plurality of the users of the mobile terminals; and cause a transmission of the selection of at least one optimal subscriber identity module for use by the mobile terminal.

10 Claims, 14 Drawing Sheets

| | 1300 | 1302 | 1304 | 1306 | 1308 | 1310 | 1312 | 1314 | 1316 | 1318 |
|---|---|---|---|---|---|---|---|---|---|---|
| | USER | USER INFO | INVOICING INFO | SIM-0 | SIM-1 | SIM-2 | ... | SIM-N | TOTAL INFO | FORE-CASTING |
| 1320 | NAME 1 | USER INFO 1 | INVOICING INFO 1 | SIM-0 INFO 1 | SIM-1 INFO 1 | SIM-2 INFO 1 | ... | SIM-N INFO 1 | TOTAL INFO 1 | FORE-CASTING INFO 1 |
| 1322 | NAME 2 | USER INFO 2 | INVOICING INFO 2 | SIM-0 INFO 2 | SIM-1 INFO 2 | SIM-2 INFO 2 | ... | SIM-N INFO 2 | TOTAL INFO 2 | FORE-CASTING INFO 2 |
| 1324 | ... | ... | ... | ... | ... | ... | ... | ... | ... | ... |
| 1330 | TOTAL INFO | | | | | | | | | |
| 1340 | FORECASTING | | | | | | | | | |

FIG. 13

|  | 1400 | 1402 | 1404 | 1406 | 1408 | 1410 | 1412 | 1414 | 1416 | 1418 | 1420 |
|---|---|---|---|---|---|---|---|---|---|---|---|
|  | AREA | SIM | STATUS | BALANCE | MIN/DAY | MB/DAY | 1 | 2 | 3 | 4 | 5 |
| 1430 | FIN | SIM1 | IN USE | +5.00€ | 200 | 100 | ▓ | ▓ | ▓ | ▓ | ▓ |
| 1432 | DE | SIM2 | IN USE | +10.00€ | 100 | 50 |  | ▓ |  |  | ▓ |
| 1434 | FR | SIM3 | NOT ACTIVATED | +0.00€ | NO, AVG | NO, AVG |  |  |  | ▓ |  |
| 1436 | GB | TBD |  |  | NO, AVG | NO, AVG |  |  |  |  | ▓ |

1422 PRESENT & FUTURE

FIG. 14A

|  | 1400 | 1402 | 1404 | 1442 | 1444 | 1412 | 1414 | 1416 | 1418 | 1420 |
|---|---|---|---|---|---|---|---|---|---|---|
|  | AREA | SIM | STATUS | MIN/MB/7 | MIN/MB/8 | 1 | 2 | 3 | 4 | 5 |
| 1430 | FIN | SIM1 | IN USE | 120/120 | 80/200 | ▓ | ▓ | ▓ | ▓ | ▓ |
| 1432 | DE | SIM2 | IN USE | ←1450 NO USE 6M→ |  |  | ▓ |  |  | ▓ |
| 1434 | FR | SIM3 | NOT ACTIVATED |  |  |  |  |  | ▓ |  |
| 1436 | GB | TBD |  |  |  |  |  |  |  | ▓ |

1424 HISTORY — 1422 PRESENT & FUTURE

1452 UPD, 1454 PRE, 1456 ACT, 1426

FIG. 14B

MANAGEMENT OF MULTIPLE SUBSCRIBER IDENTITY MODULES

FIELD

The invention relates to management of multiple subscriber identity modules.

BACKGROUND

Four previous European patent applications by the Applicant, 12151906.0, 12151908.6, 12154706.1, and 12163858.9 disclose various apparatuses utilizing a set of subscriber identity modules (SIM) for one user of a mobile terminal. As the subscriber identity modules are not designed for such sophisticated use, the management of multiple subscriber identity modules requires further ideas.

BRIEF DESCRIPTION

According to an aspect of the present invention, there is provided a server comprising: one or more processors, and one or more memories storing instructions, that, when executed by the one or more processors, cause the server, to: for a plurality of users of mobile terminals, cause an analysis on use of each subscriber identity module belonging to a set of subscriber identity modules of a user of a mobile terminal; for the plurality of the users of the mobile terminals, cause a prediction of a future use of the each subscriber identity module belonging to the set on the basis of the analysis; for the plurality of the users of the mobile terminals, cause a selection of at least one optimal subscriber identity module for use by the mobile terminal on the basis of the prediction such that the use of the subscriber identity modules is optimized for the plurality of the users of the mobile terminals; and for the plurality of the users of the mobile terminals, cause a transmission of the selection of at least one optimal subscriber identity module from among the set of the subscriber identity modules for use by the mobile terminal.

LIST OF DRAWINGS

Example embodiments of the present invention are described below, by way of example only, with reference to the accompanying drawings, in which FIGS. 1, 2, 3, 4, 5 and 6 illustrate example embodiments of an apparatus;

FIGS. 12 and 13 illustrate example embodiments relating to topping up of the subscriber identity modules;

FIGS. 14A and 14B illustrate example embodiments relating to analysis, prediction and action on use of the subscriber identity module.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while FIGS. 1 to 6, 10, 12 and 15 illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses have been depicted as separate single entities, different parts may be implemented in one or more physical or logical entities.

Figure 1:
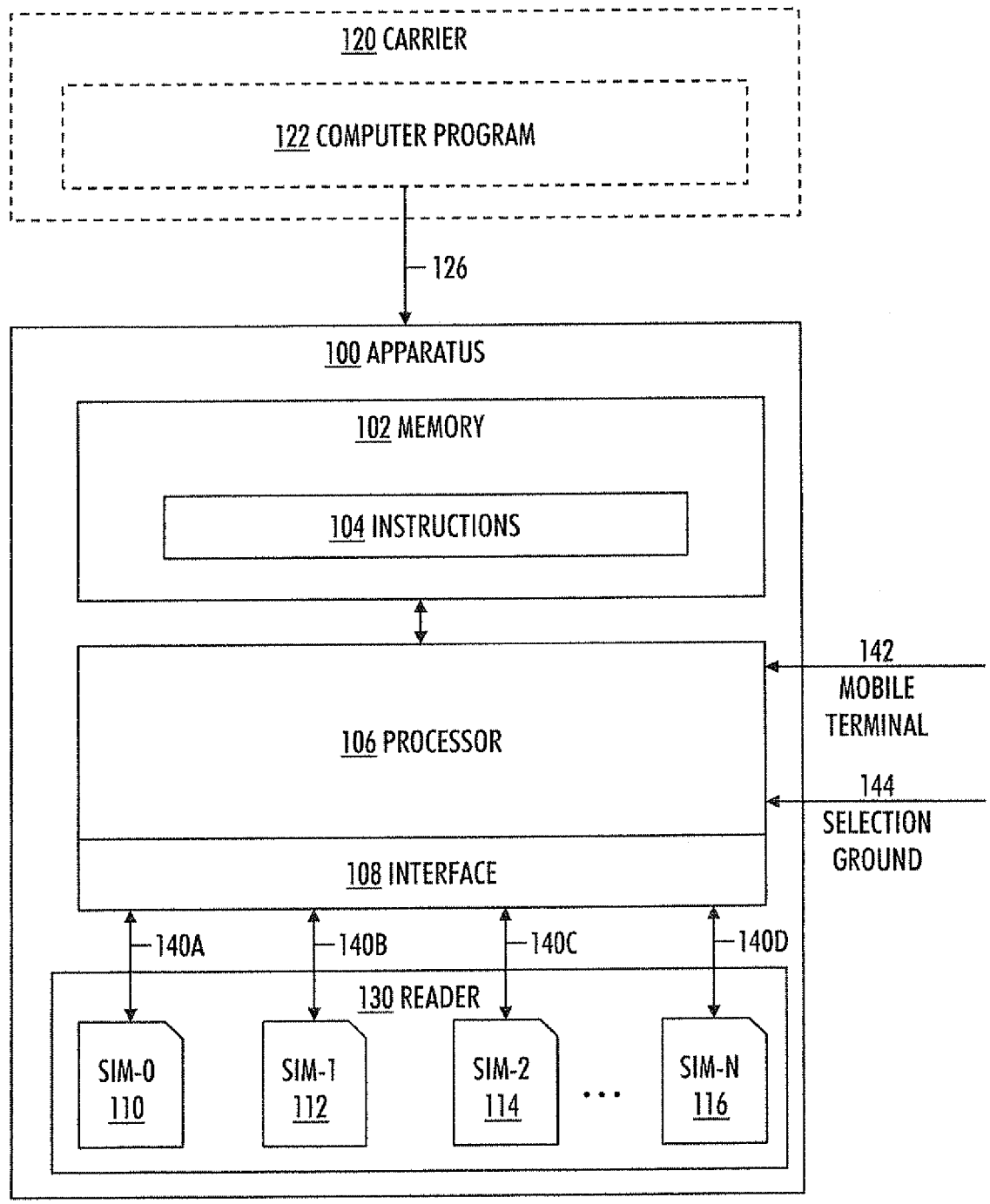

As shown in FIG. 1, an apparatus 100 comprises an interface 108 to a set of subscriber identity (SIM) modules 110, 112, 114, 116 of a wireless communication system. The interface 108 may or may not include a (contact) smart card reader 130 capable of reading the subscriber data through the contacts of the integrated circuit.

The number of the subscriber identity modules 110, 112, 114, 116 may vary according to the circumstances, but there are at least three subscriber identity modules. One subscriber identity module 110 may be a default subscriber identity module used normally (in user's home location or in a network where he/she has the coverage of the default subscriber identity module, for example). The number of other subscriber identity modules 112, 114, 116 may vary between 2 to N, wherein N is an integer greater than two, whereby the minimum number of the subscriber identity modules (0, 1, 2, . . . , N) is three.

In an example embodiment, the subscriber identity module 110, 112, 114, 116 is an integrated circuit storing subscriber data, which is network-specific information used to authenticate and identify subscribers on the network. The subscriber identity module may be embedded into a removable SIM card. First SIM cards were of credit card size, 85.60 mm×53.98 mm×0.76 mm, but a newer mini-SIM card is considerably smaller, 25 mm×15 mm×0.76 mm, or a micro-SIM card is even smaller, 15 mm×12 mm×0.76 mm. Naturally, these measures are only example embodiments. It is also to be noted than one physical SIM card may include a number of different subscriptions: one SIM card may be a multi-IMSI SIM card having many different subscriber identities in the same card.

Even a virtual subscriber identity module is feasible: it is a mobile phone number provided by a mobile network operator that does not require a SIM card to connect phone calls to the user's mobile terminal. In such a scenario, the at least one memory 102 of the apparatus 100 may be used to store subscriber data of the virtual subscriber identity module as required.

The wireless communication system may be any standard/non-standard/proprietary radio system that supports the use of the subscriber identity modules 110, 112, 114, 116. In the present, such a system may be any mobile telephone system, regardless of the generation (such as 2G, 3G, 4G, beyond 4G, etc.). Consequently, the wireless communication system may be GSM (Global System for Mobile Communications), WCDMA (Wideband Code Division Multiple Access), TD-SCDMA (Time Division Synchronous Code Division Multiple Access), or evolved universal terrestrial radio access (E-UTRA), also known as long term evolution (LTE) for example, or its recent LTE-Advanced versions (LTE-A). However, the example embodiments are not restricted thereto, but may be applicable to other suitable radio systems (in their present forms and/or in their evolution forms), such as universal mobile telecommunications system (UMTS) radio access network (UTRAN or EUTRAN), a system based on International Mobile Telecommunication (IMT) standard or any one of its evolution versions (e.g. IMT-Advanced), wireless local area network (WLAN) based on IEEE (Institute of Electrical and Electronics Engineers) 802.11 standard or its evolution versions (IEEE 802.11ac), worldwide interoperability for microwave access (WIMAX), Wi-Fi, 3GPP, Bluetooth®, or personal communications services (PCS).

Figure 7:
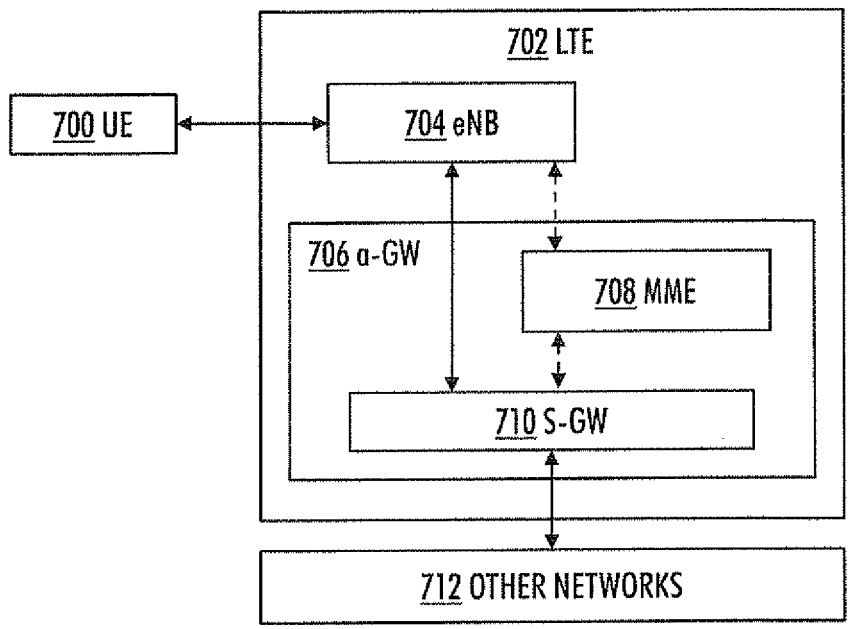
FIG. 7 illustrates an example embodiment of a wireless communication system.

FIG. 7 illustrates an example of the radio system 702, LTE. The three basic elements of the radio system 702 are UE 700 (=mobile terminal), eNB (=base station) 704 in a radio network and an access gateway (a-GW) 706 in a core network. In such a division, the apparatus 100 is either in the UE 700 or coupled to it, but not in the eNB 704 nor in the a-GW 706.

The base station may be called, depending on the system, a Node B, enhanced or evolved NodeB (eNB), a home eNode B (HeNB), an access point (AP), an IEEE 802.11 based access point, a femto node, a femto base station, or any other equipment belonging to the network infrastructure of the wireless communication system, and implementing the radio communication interface with the mobile terminal. Functionalities of the eNB 704 may include: all radio protocols, mobility management, all retransmissions, header compression, and packet data convergence protocols. The a-GW 706 provides the interface of the cellular radio system 702 to/from the other networks 712 such as the Internet. The a-GW 706 may be streamlined by separating the user and the control planes: a mobility management entity (MME) 708 is just a control plane entity and the user plane bypasses MME 708 directly to a serving gateway (S-GW) 710.

The apparatus 100 also comprises one or more processors 106, and one or more memories 102 storing instructions 104. In an example embodiment, the instructions 104, when executed by the one or more processors 106, cause the apparatus 100 to obtain data 140A, 140B, 140C, 140D relating to the subscriber identity modules 110, 112, 114, 116, obtain data 142 relating to a mobile terminal, obtain at least one selection ground 144 for the subscriber identity module, and select at least one optimal subscriber identity module 110, 112, 114, 116 for use by the mobile terminal on the basis of the data 140A, 140B, 140C, 140D relating to the subscriber identity modules, the data 142 relating to the mobile terminal, and the at least one selection ground 144 for the subscriber identity module. With this kind of processing, utilization of many and wide range of subscriber identity modules becomes possible, and, furthermore, selection of the right subscriber identity module becomes user friendly and automatic (or at least semi-automatic if user interaction is required for the selection or its confirmation).

The term 'processor' 106 refers to a device that is capable of processing data. Depending on the processing power needed, the apparatus 100 may comprise several processors 106 such as parallel processors or a multicore processor. When designing the implementation of the processor 106, a person skilled in the art will consider the requirements set for the size and power consumption of the apparatus 100, the necessary processing capacity, production costs, and production volumes, for example. The processor 106 and the memory 102 may be implemented by an electronic circuitry. In an example embodiment, the processor 106 is Freescale™ i.MX233 applications processor such as MCIMX233CJM4C and the memory 102 includes NAND type flash memory such as Micron® MT29F1G08ABADAH4-IT:D, and mobile DDR (=type of double data rate synchronous DRAM) SDRAM such as Micron® MT46H32M16LFBF-6 IT:C.

A non-exhaustive list of implementation techniques for the processor 106 and the memory 102 includes, but is not limited to:

logic components,
standard integrated circuits,
application-specific integrated circuits (ASIC),
system-on-a-chip (SoC),
application-specific standard products (ASSP),
microprocessors,
digital signal processors,
special-purpose computer chips, and
field-programmable gate arrays (FPGA).

The instructions 104 may be implemented by software and/or hardware. In an example embodiment, the software may be written by a suitable programming language (such as C, C++, or Java), and the resulting executable instructions 104 may be stored on the memory 102 and run by the microprocessor 106. In an example embodiment, the functionality of the hardware may be designed by a suitable hardware description language (such as Verilog or VHDL), and transformed into a gate-level netlist (describing standard cells and the electrical connections between them), and after further phases the chip implementing the processor 106, memory 102 and the instructions 104 may be fabricated with photo masks describing the circuitry.

In an example embodiment, the one or more memories 102 may further store instructions 104, that, when executed by the one or more processors 106, cause the apparatus 100 to obtain the data relating to the subscriber identity modules 110, 112, 114, 116 by at least one of the following: read the data 140A, 1406, 140C, 140D from the subscriber identity modules 110, 112, 114, 116, receive the data 140A, 140B, 140C, 140D wirelessly from a service provider, receive the data 140A, 140B, 140C, 140D from a user interface manipulated by a user of a mobile terminal.

The data 140A, 140B, 140C, 140D relating to the subscriber identity modules 110, 112, 114, 116 may include, for example, a unique serial number (Integrated Circuit Card Identifier, ICCID) of the SIM card, internationally unique number of the subscriber (International Mobile Subscriber Identity, IMSI), security authentication and ciphering information for the subscriber (such as an authentication key Ki), temporary information related to the local network, a list of the services the subscriber has access to, an operator-specific emergency number, two passwords (personal identification number, PIN, for ordinary use, and PIN unlock code, PUK, for PIN unlocking), and other required data. The subscriber data may also include other carrier-specific data such as the short message service centre (SMSC) number, service provider name (SPN), service dialing numbers (SON), advice-of-charge parameters, and value added service (VAS) applications. Further information may be found in the GSM Technical Specification 11.11.

Besides being called subscriber identity module, also other names and abbreviations may be used to refer to subscriptions. USIM (Universal Subscriber Identity Module) is an application for UMTS running on a UICC (Universal Integrated Circuit Card). The USIM is a logical entity on the physical card storing user subscriber information, authentication information, text messages, and phone book contacts. For authentication purposes, the USIM stores a long-term pre-shared secret key, which is shared with the Authentication Center (AuC) in the network. The USIM also verifies a sequence number that must be within a range using a window mechanism to avoid replay attacks, and is in charge of generating the session keys to be used in the confidentiality and integrity algorithms of the KASUMI block cipher in UMTS. The equivalent of USIM on CDMA networks is CSIM.

The service provider is not illustrated in FIG. 1, but the service provider may be an independent supplier/vendor of the subscriber identity modules 112, 114, 116 and the apparatus 100. The user interface manipulated by the user of the mobile terminal may be a user interface of the mobile terminal.

In an example embodiment, the one or more memories 102 further store instructions 104, that, when executed by the one or more processors 106, cause the apparatus 100 to obtain the data 142 relating to the mobile terminal by obtaining location of the mobile terminal, country code from the mobile terminal, pre-set parameters from the mobile terminal, time from the mobile terminal, date from the mobile terminal, day of the week from the mobile terminal, information of available operators from the mobile terminal, information of available networks from the mobile terminal, obtain type (laptop, mobile phone, tablet, etc.) of the mobile terminal, obtain model (Nokia® N9, Samsung® Galaxy, Apple® iPhone 4, etc.) of the mobile terminal, obtain info about applications (games, email, Skype™, etc.) in use or used in the mobile terminal, and/or other suitable pre-set parameters.

Location of the mobile terminal may be obtained by use of a satellite navigation receiver, for example, as will be described with reference to FIG. 2, but also from cellular location based info. Time, date, and day of the week may be obtained from a watch/calendar application of the mobile terminal, and such information may be relevant when deciding which subscriber identity module 110/112/114/116 to use as the charges may vary according to the time of day, day of the week, or also during special holidays. Information relating to the available operators and available networks may be obtained from an appropriate application of the mobile terminal as the mobile terminal may listen to certain frequencies, and such information may also be relevant for deciding the right subscriber identity module 110/112/114/116 for use as the user may have some preferences relating to the operator, and also the type of the network may affect the decision. The type of the network, for example, may set limits to the data transfer rate, and depending on the user's requirements, a high enough data transfer rate may be desirable.

Each location area of a public land mobile network (PLMN) has its own unique identifier which is known as Location Area Identity (LAI). This internationally unique identifier is used for location updating of mobile subscribers. It is composed of a three decimal digit Mobile Country Code (MCC), a two to three digit Mobile Network Code (MNC) that identifies the GSM PLMN in that country, and a Location Area Code (LAC) which is a 16-bit number thereby allowing 65536 location areas within one GSM PLMN.

In an example embodiment, the one or more memories 102 further store instructions 104, that, when executed by the one or more processors 106, cause the apparatus 100 to obtain the at least one selection ground 144 for the subscriber identity module by obtaining network coverage criterion, available services criterion, quality of service criterion, costs of using the subscriber identity module criterion, location of the mobile terminal criterion.

The various criteria may be used alone or in combination. A simple selection ground 144 could be formulated as follows: "use the cheapest subscriber identity module 110/112/114/116 that provides the required service at the required quality of service in the present location of the mobile terminal by network operator A if available, and if operator A is not available then by any other operator fulfilling the criteria", but this is only an example embodiment, as the selection ground 144 may be made much simpler but also much more complex.

Figure 9:
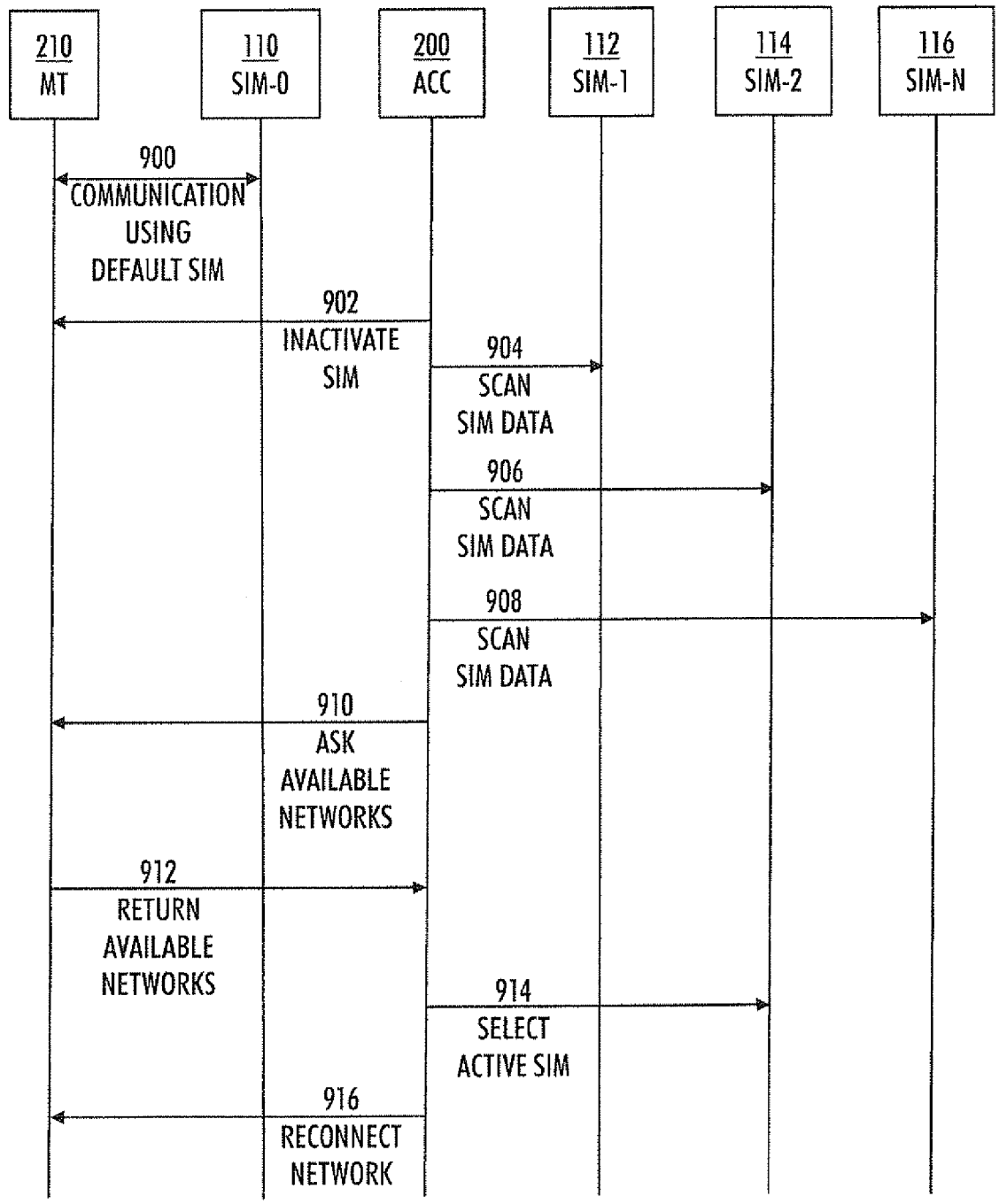
FIG. 9 is a signal sequence chart of some example embodiments.

FIG. 9 is a signal sequence chart of some example embodiments.

In an example embodiment, the one or more memories 102 further store instructions 104, that, when executed by the one or more processors 106, cause the apparatus 100 to treat one of the subscriber identity modules 110 as the default subscriber identity module and to use the default subscriber identity module 110 after start-up of the mobile terminal. The default subscriber identity module 110 may, besides being the starting subscriber identity module, be also the controlling subscriber identity module, and possibly also the back-up subscriber identity module. In FIG. 9, the mobile terminal 210 uses 900 the default SIM 110 for communication.

In an example embodiment, the one or more memories 102 further store instructions 104, that, when executed by the one or more processors 106, cause the apparatus 100 to detect roaming of the mobile terminal, and to initiate said selection of the at least one optimal subscriber identity module 112/114/116 for use by the mobile terminal. Roaming is the ability for a cellular customer to automatically make and receive voice calls, send and receive data, or access other services when travelling outside the geographical coverage area of the home network, by means of using a visited network. Roaming is technically supported by mobility management, authentication and billing procedures. If the visited network is in the same country as the home network, this is known as National Roaming. If the visited network is outside the home country, this is known as International (or Global) Roaming. If the visited network operates on a different technical standard than the home network, this is known as Inter-standard roaming. GSM Coverage Maps is a unique resource containing information supplied and approved by the members of the GSM Association. Network, services and roaming information are continually updated to reflect the evolving situation worldwide. In FIG. 9, the accessory 200 inactivates 902 the mobile terminal 210, and scans 904, 906, 908 SIM data from the set of available subscriber identity modules 112, 114, 116 that are located in the accessory 200. Next, the accessory 200 asks 910 available networks from the mobile terminal 210, whereupon the mobile terminal 210 returns 912 the available networks to the accessory 200. The accessory 200 then selects 914 at least one optimal subscriber identity module 112, 114, 116 for use by the mobile terminal as the active SIM on the basis of the data 904, 906, 908 relating to the subscriber identity modules 112, 114, 116, the data 912 relating to the mobile terminal 210, and the at least one selection ground for the subscriber identity module. In our example, SIM-2 114 is selected 914 as the active SIM, whereupon the accessory 200 instructs 916 the mobile terminal 210 to reconnect network with the optimal active subscriber identity module 114.

In an example embodiment, the one or more memories 102 further store instructions 104, that, when executed by the one or more processors 106, cause the apparatus 100 to detect if the default subscriber identity module 110 is taken out of the use and instead at least one more optimal subscriber identity module 112/114/116 is taken into use, in which case the apparatus 100 is caused to switch on a call forwarding from the default subscriber identity module 110 to one of the more optimal subscriber identity modules 112/114/116 taken into use. With such call forwarding (or diversion) an incoming call to the default subscriber identity module 110 that is not currently in use is redirected to the currently used, more optimal subscriber identity module 112/114/116.

In an example embodiment, the one or more memories 102 further store instructions 104, that, when executed by the one or more processors 106, cause the apparatus 100 to perform said selection of the at least one optimal subscriber identity module 112/114/116 for use by the mobile terminal in two stages, by pre-selecting subscriber identity modules that are usable on the basis of the data 140A, 140B, 140C, 140D relating to the subscriber identity modules and the data 142 relating to the mobile terminal, and by selecting at least one subscriber identity module for use by the mobile terminal from among the pre-selected subscriber identity modules on the basis of the at least one selection ground 144. With this kind of two-stage selection, processing may become simpler, as the pre-selection removes unfeasible subscriber identity modules, whereupon the final selection may be made among a smaller set of subscriber identity modules.

In an example embodiment, the apparatus 100 may be a mobile wireless communications terminal, an accessory of a mobile wireless communications terminal, a combination of a mobile wireless communications terminal and an accessory of the mobile wireless communications terminal, an accessory of a mobile terminal, a combination of a mobile terminal and an accessory of the mobile terminal, or a USB (Universal Serial Bus) modem, or any other suitable mobile terminal capable of employing the set of subscriber identity modules 110, 112, 114, 116, such as a mobile phone, a tablet pc, a portable computer, or a computer. In an example embodiment, the apparatus 100 is a part of a mobile base station, which may employ any earlier mentioned wireless communication system or their combination.

However, in an example embodiment, the apparatus 100 may also be interpreted as a circuitry implementing the required functionality within some suitable equipment.

If the apparatus 100 is an independent apparatus, then it may also comprise equipment needed for other tasks as well. On the other hand, if the apparatus 100 is the circuitry, then it may only comprise the processor 106, the memory 102, the instructions 104, and the interface 108.

Various example embodiments will be explained with reference to FIGS. 2, 3, 4, 5 and 6.

Figure 6:
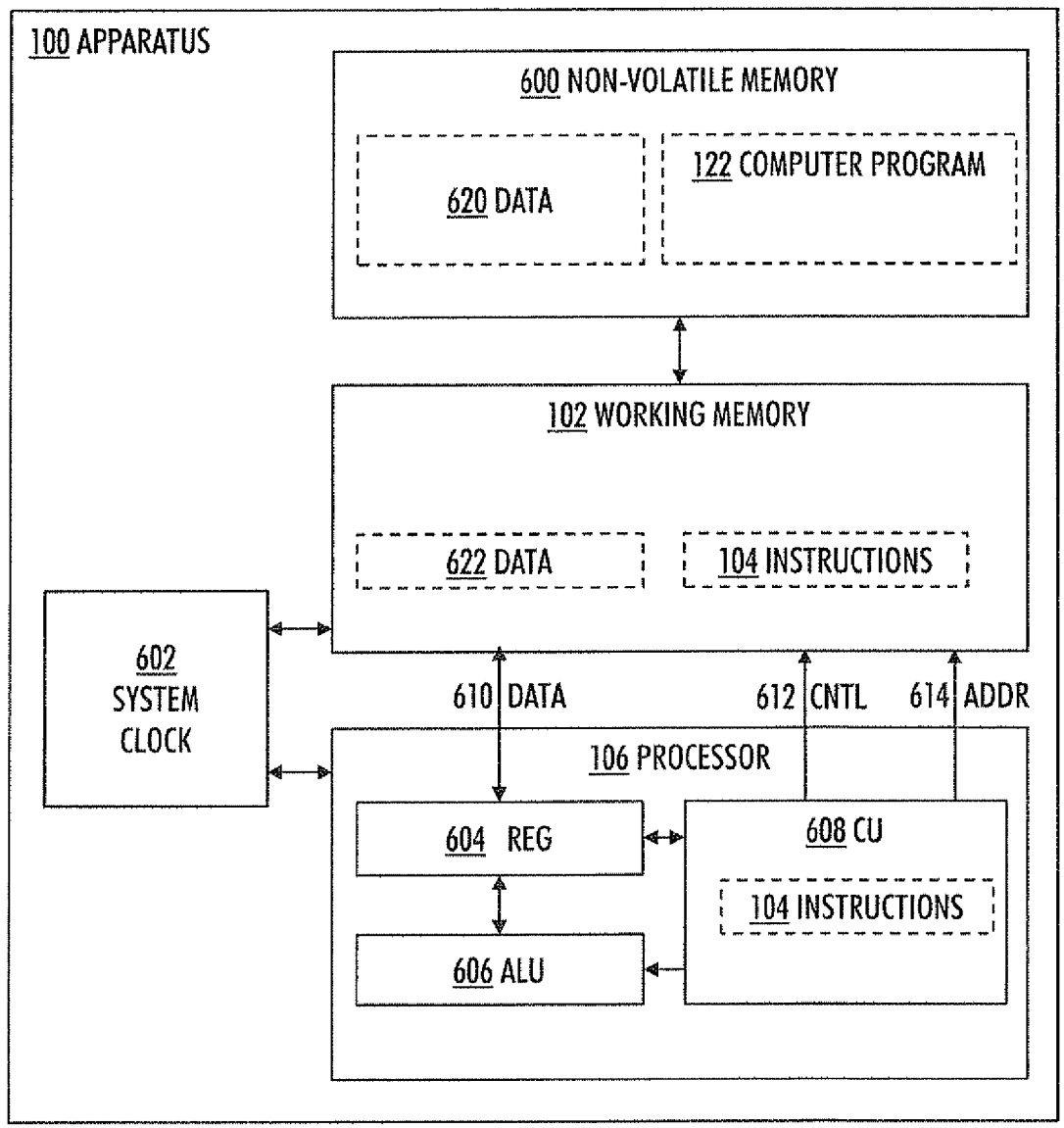

In an example embodiment illustrated in FIG. 6, the apparatus 100 may be an electronic digital computer, which may comprise, besides the processor 106 and the (working) memory 102, a non-volatile memory 600, and a system clock 602. Naturally, the computer may comprise a number of other peripheral devices, not illustrated here for the sake of clarity.

In an example embodiment, the system clock 602 constantly generates a stream of electrical pulses, which cause the various transferring operations within the computer to take place in an orderly manner and with specific timing.

In an example embodiment, the processor 106 may be implemented as a microprocessor implementing functions of a central processing unit (CPU) on an integrated circuit. The CPU is a logic machine executing a computer program 122, which comprises the program instructions 104. The instructions 104 may be coded as a computer program using a programming language, which may be a high-level programming language, such as C, or Java, or a low-level programming language, such as a machine language, or an assembler. The CPU may comprise a set of registers 604, an arithmetic logic unit (ALU) 606, and a control unit (CU) 608. The control unit 608 is controlled by a sequence of instructions 104 transferred to the CPU from the working memory 102. The control unit 608 may contain a number of microinstructions for basic operations. The implementation of the microinstructions may vary, depending on the CPU design. The microprocessor 106 may also have an operating system (a dedicated operating system of an embedded system, or a real-time operating system), which may provide the computer program 122 with system services.

In an example embodiment, there may be three different types of buses between the working memory 102 and the processor 106: a data bus 610, a control bus 612, and an address bus 614. The control unit 608 uses the control bus 612 to set the working memory 102 in two states, one for writing data into the working memory 102, and the other for reading data from the working memory 102. The control unit 608 uses the address bus 614 to send to the working memory 102 address signals for addressing specified portions of the memory in writing and reading states. The data bus 610 is used to transfer data 622, such as data 140A, 140B, 140C, 140D, 142, 144, from the working memory 102 to the processor 106 and from the processor 106 to the working memory 102, and to transfer the instructions 104 from the working memory 102 to the processor 106. During running of the program 122, the instructions 104 are transferred via the data bus 610 from the working memory 102 into the control unit 608, wherein usually a portion of the instructions 104 resides and controls the operation of the apparatus 100.

In an example embodiment, the working memory 102 may be implemented as a random-access memory (RAM), where the information is lost after the power is switched off. The RAM is capable of returning any piece of data in a constant time, regardless of its physical location and whether or not it is related to the previous piece of data. The data may comprise data 140A, 140B, 140C, 140D, 142, 144 and any other permanent or temporary data needed during the processing, program instructions etc.

In an example embodiment, the non-volatile memory 600 retains the stored information even when not powered. Examples of non-volatile memory include read-only memory (ROM), flash memory, magnetic computer storage devices such as hard disk drives, and optical discs. As is shown in FIG. 6, the non-volatile memory 600 may store both data 620 and the computer program 122 comprising the instructions 104.

An example embodiment provides a computer program 122 comprising the instructions 104 which, when loaded 126 into the apparatus 100, cause the apparatus 100 to obtain data 140A, 140B, 140C, 140D relating to the subscriber identity modules 110, 112, 114, 116, obtain data 142 relating to a mobile terminal, obtain at least one selection ground 144 for the subscriber identity module, and select at least one optimal subscriber identity module 110, 112, 114, 116 for use by the mobile terminal on the basis of the data 140A, 140B, 140C, 140D relating to the subscriber identity modules, the data 142 relating to the mobile terminal, and the at least one selection ground 144 for the subscriber identity module.

In an example embodiment, the computer program 122 may be in source code form, object code form, or in some intermediate form. The computer program 122 may be stored in a carrier 120, which may be any entity or device capable of carrying the program 122 to the apparatus 100. The carrier 120 may be a computer-readable storage medium. Besides this, the carrier 120 may be implemented as follows, for example: the computer program 122 may be embodied on a record medium, stored in a computer memory, embodied in a read-only memory, carried on an electrical carrier signal, carried on a telecommunications signal, and/or embodied on a software distribution medium. In some jurisdictions, depending on the legislation and the patent practice, the carrier 120 may not be the telecommunications signal. The medium 120 may be a non-transitory computer-readable storage medium.

FIG. 1 illustrates an example embodiment in which the carrier 120 may be coupled 126 with the apparatus 100, whereupon the program 122 comprising the instructions 104 is transferred into the (working) memory 102, and possibly also into the non-volatile memory 600. The program 122 with its instructions 104 may be loaded from the non-volatile memory 600 into the working memory 102 as needed.

There are many ways to structure the program 122. In an example embodiment, the operations of the program may be divided into functional modules, sub-routines, methods, classes, objects, applets, macros, etc., depending on the software design methodology and the programming language used. In modern programming environments, there are software libraries, i.e. compilations of ready-made functions, which may be utilized by the program for performing a wide variety of standard operations.

Figure 2:
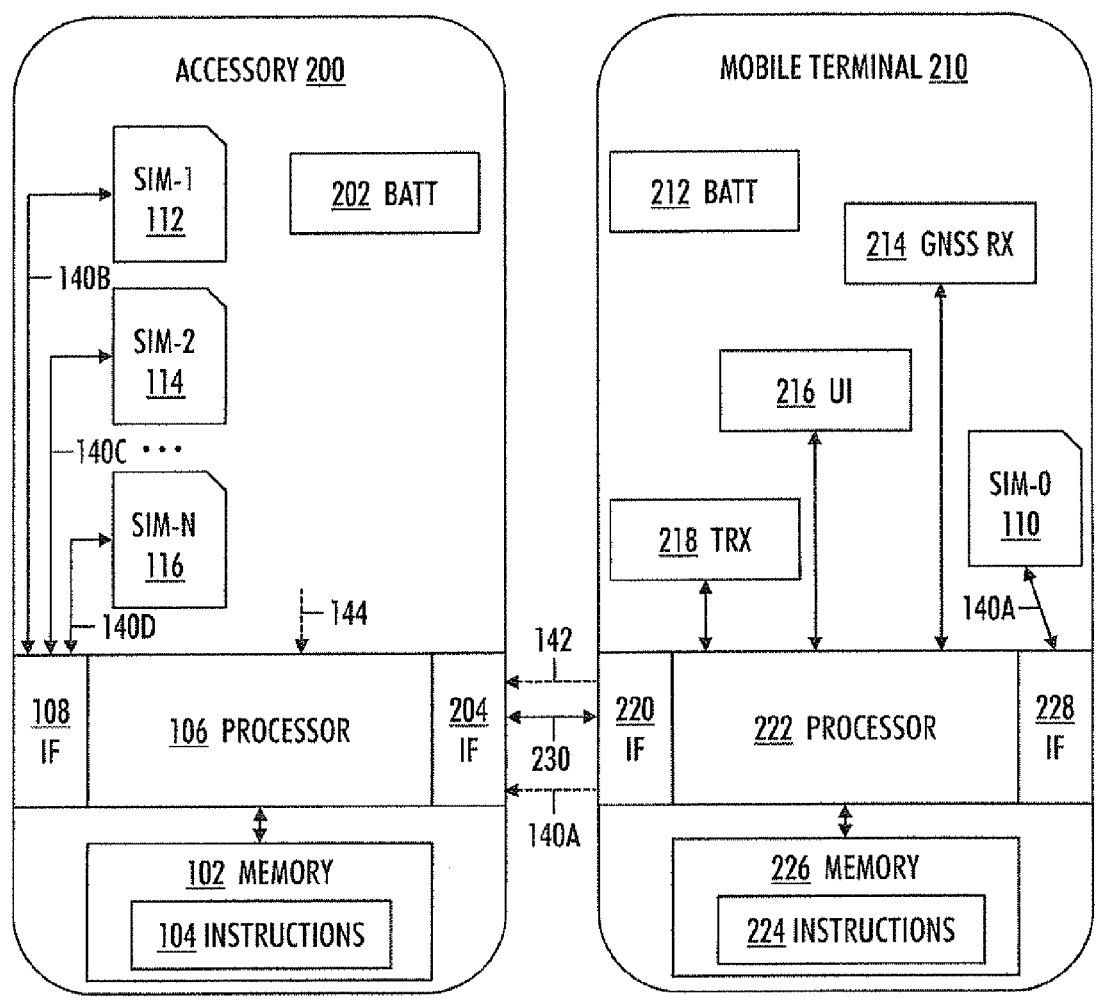

FIG. 2 illustrates an example embodiment wherein the apparatus 100 functionality is implemented in an accessory 200 of a mobile terminal 210. Consequently, the accessory 200 comprises the set of the subscriber identity modules 112, 114, 116, and the at least one processor 106 and at least one memory 102 with the instructions 104.

The accessory 200 may or may not comprise a battery 202, depending on the power requirements of the accessory 200 and the possibility to obtain electric energy from an external source such as the mobile terminal 210. The (rechargeable) electrical battery 202 is one or more electrochemical cells that convert stored chemical energy into electrical energy. Instead of battery 202, other suitable accumulator means may be used to store energy.

The interface 108 to the subscriber identity modules 110, 112, 114, 116 is within the accessory 200, but also another interface 228 to the subscriber identity module 110 possibly located in the mobile terminal 210 may be needed.

Furthermore, both the mobile terminal 210 and the accessory 200 comprise a wired/wireless standard/proprietary communication protocol interface 204, 220 enabling two-way communication 230 between the mobile terminal 210 and the accessory 200. In an example embodiment, the interface 204, 220 is implemented as a serial or parallel communication bus, hardware line, an USB (Universal Serial Bus) cable with appropriate connectors, a SIM bus according to ISO/IEC 7816-3, a wireless Bluetooth link, a wireless WLAN (Wireless Local Area Network) link, a wireless Wi-Fi (Wireless Fidelity) link, a serial bus such as UART (Universal Asynchronous Receiver/Transmitter), I²C (Inter-Integrated Circuit) or SPI (System Packet Interface). The data 140A relating to the subscriber identity module 110 and the data 142 relating to the mobile terminal 210 may be transferred from the mobile terminal 210 to the accessory 200 through the interfaces 204, 220.

The instructions 104, when executed by the one or more processors 106 of the accessory 200, cause the accessory 200 to obtain the data 140A, 140B, 140C, 140D relating to the subscriber identity modules 110, 112, 114, 116, obtain the data 142 relating to the mobile terminal 210, obtain at least one selection ground 144 for the subscriber identity module, and select at least one optimal subscriber identity module 110, 112, 114, 116 for use by the mobile terminal 210 on the basis of the data 140A, 140B, 140C, 140D relating to the subscriber identity modules, the data 142 relating to the mobile terminal 210, and the at least one selection ground 144 for the subscriber identity module.

In an example embodiment, the mobile terminal 210 may be a mobile wireless communications terminal employing a transceiver 218 capable of communicating with a wireless communication system, such as 702 illustrated in FIG. 7. In an example embodiment, the mobile terminal 210 may be a mobile phone comprising the default subscriber identity module 110, a user interface 216, a battery 212, at least one processor 222 and at least one memory 226 with instructions 224.

The user interface 216 may comprise a display, means for producing sound, a keyboard, and/or a keypad, for example. The display may be a liquid crystal display, for example, but it may also be implemented by any appropriate prior art technique, such as with an active-matrix organic light-emitting diode. The display may also incorporate other user interaction means, such as touch input, or haptic feedback, i.e. the display may be a touch screen. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 216 may comprise other user interface elements, for example various means for focusing a cursor (mouse, track ball, various arrow keys, touch sensitive area etc.) or elements enabling audio control. A parameter, setting or command relating to the described processing of the subscriber identity modules 110, 112, 114, 116 may be manipulated with the user interface 216.

Furthermore, the mobile terminal 210 may comprise a positioning receiver 214 receiving external location information, which may be utilized to generate location of the mobile terminal 210. The positioning receiver 214 may be a receiver of a global navigation satellite system (GLASS). Such a system may be the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. The positioning receiver 214 determines its location (longitude, latitude, and altitude) using signals transmitted from satellites orbiting the earth. Besides global navigation satellites, the positioning receiver 214 may also determine its location by utilizing other known positioning techniques. It is well known that by receiving radio signals from several different base stations, a mobile phone may determine its location, for example.

In the example embodiment of FIG. 2, the accessory 200 does not comprise a user interface of its own, but the user interaction is performed through the user interface 216 of the mobile terminal 210 as data may be transferred between the accessory 200 and the mobile terminal 210 through the interfaces 204, 220. However, in another example embodiment, the accessory 200 may comprise a user interface as well for outputting and/or inputting data relating to the described processing of the subscriber identity modules 110, 112, 114, 116.

In the example embodiment of FIG. 2, the apparatus 100 functionality may be implemented in the accessory 200 such that the instructions 104 are run in the at least one processor 106 of the accessory 200. However, also such an example embodiment is feasible wherein a part of the apparatus 100 functionality is implemented in the mobile terminal 210 as well such that a part of the instructions 104 are also run in the at least one processor 222 of the mobile terminal 210.

Figure 3:
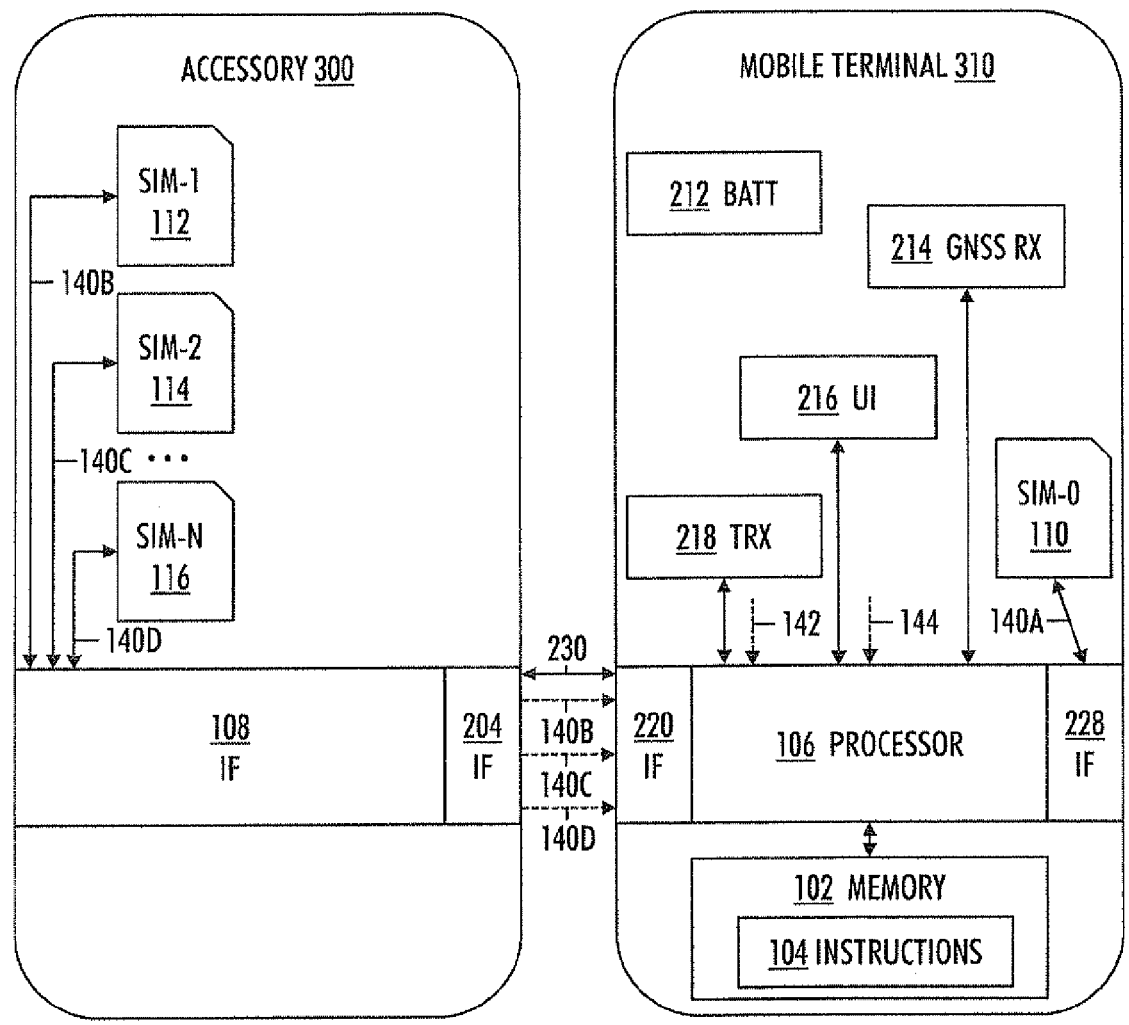

FIG. 3 illustrates an example embodiment wherein the apparatus 100 functionality is divided between an accessory 300 of a mobile terminal 310 and the mobile terminal 310. Consequently, the accessory 300 comprises the set of the subscriber identity modules 112, 114, 116. The interface 108 to the subscriber identity modules 110, 112, 114, 116 is within the accessory 300, but also another interface 228 to the subscriber identity module 110 possibly located in the mobile terminal 310 may be needed. But, as shown in FIG. 3, the accessory 300 does not require a processor or a memory.

The mobile terminal 310 comprises the at least one processor 106 and at least one memory 102 with the instructions 104, and also the other parts 110, 212, 214, 216, 218, 220, 228 as shown in FIG. 3, and explained in relation to FIG. 2.

In the example embodiment of FIG. 3, the accessory 300 is a kind of container including the extra subscriber identity modules 112, 114, 116 to be used by the mobile terminal 310, but the required processing is performed only in the at least one processor 106 of the mobile terminal 310.

The data 140B, 140C, 140D relating to the subscriber identity modules 112, 114, 116 may be transferred from the accessory 300 to the mobile terminal 310 through the interfaces 204, 220.

The instructions 104, when executed by the one or more processors 106 of the mobile terminal 310, cause the mobile terminal 310 to obtain the data 140A, 140B, 140C, 140D relating to the subscriber identity modules 110, 112, 114, 116, obtain the data 142 relating to the mobile terminal 310, obtain at least one selection ground 144 for the subscriber identity module, and select at least one optimal subscriber identity module 110, 112, 114, 116 for use by the mobile terminal 310 on the basis of the data 140A, 140B, 140C, 140D relating to the subscriber identity modules, the data 142 relating to the mobile terminal 310, and the at least one selection ground 144 for the subscriber identity module.

Figure 4:
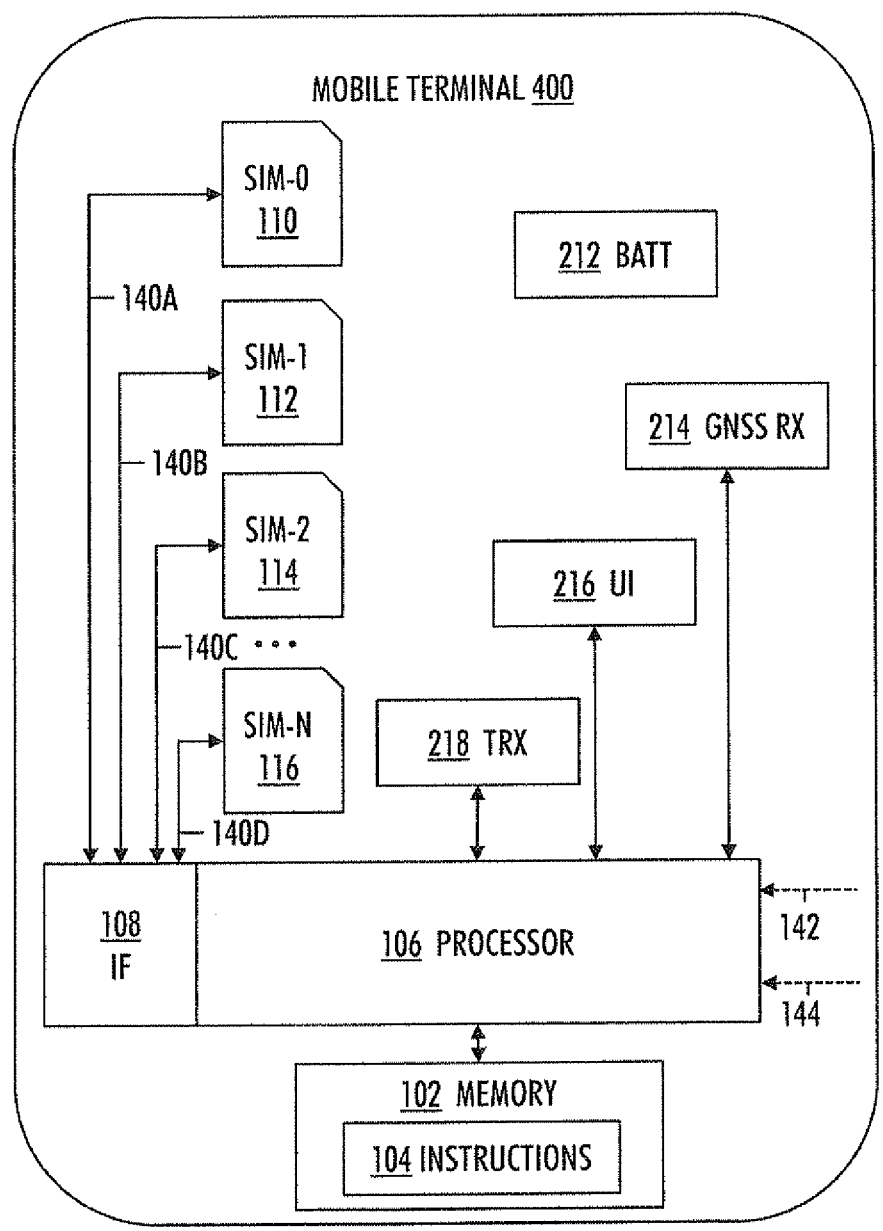

FIG. 4 illustrates an example embodiment wherein the apparatus 100 functionality is implemented to a mobile terminal 400. Consequently, the mobile terminal 400 comprises the interface 108 to the set of the subscriber identity modules 110, 112, 114, 116 of the wireless communication system, the one or more processors 106, and the one or more memories 102 storing the instructions 104. The instructions 104, when executed by the one or more processors 106, cause the mobile terminal 400 to obtain data 140A, 140B, 140C, 140D relating to the subscriber identity modules 110, 112, 114, 116 through the interface 108, obtain data 142 relating to the mobile terminal 400, obtain at least one selection ground 144 for the subscriber identity module, and select at least one optimal subscriber identity module for use by the mobile terminal 400 on the basis of the data 140A, 140B, 140C, 1400 relating to the subscriber identity modules 110, 112, 114, 116, the data 142 relating to the mobile terminal 400, and the at least one selection ground 144 for the subscriber identity module. The mobile terminal 400 may also comprise at least some of the other parts 212, 214, 216, 218 as shown in FIG. 4, and explained in relation to FIG. 2.

Figure 5:
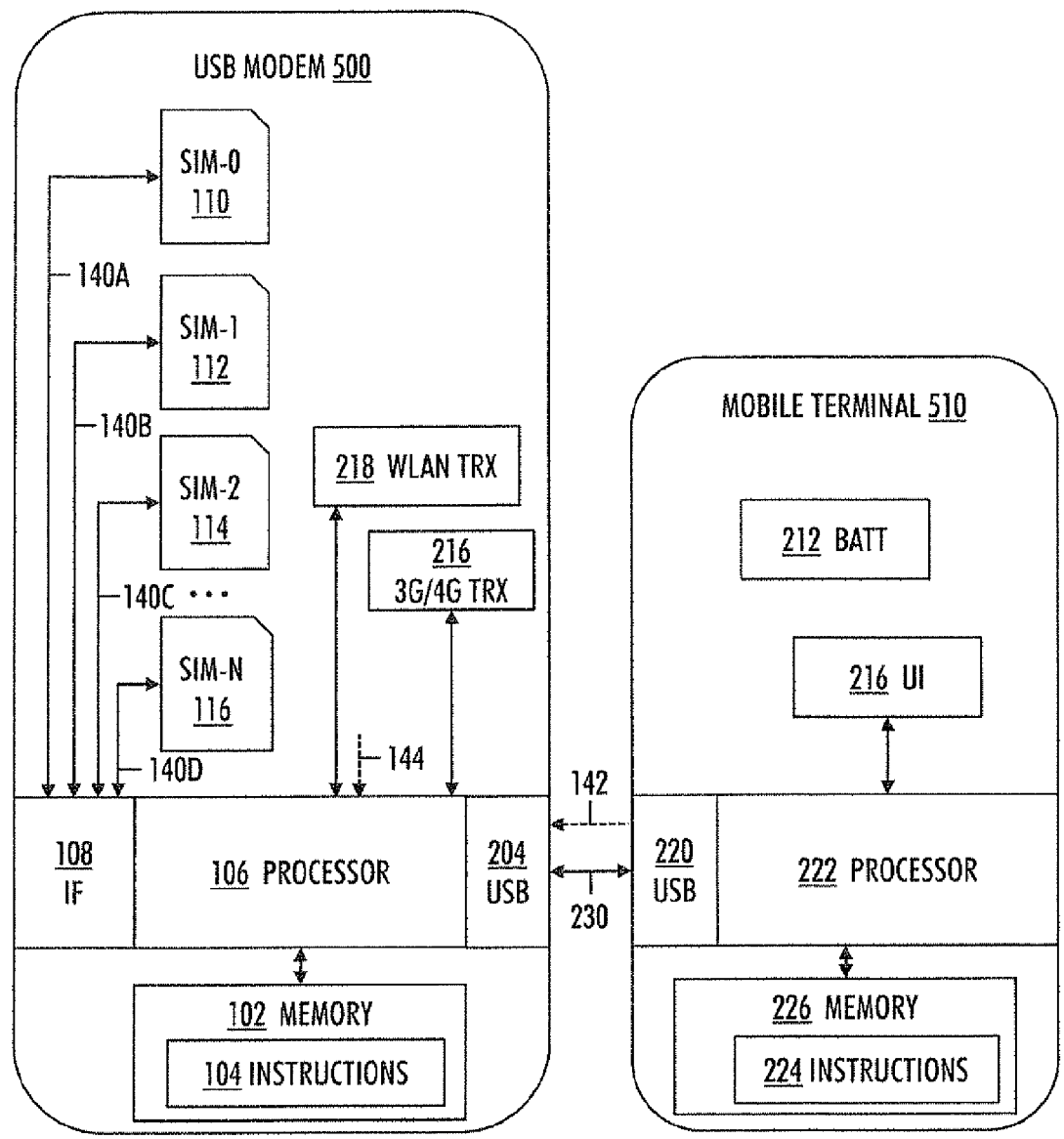

FIG. 5 illustrates an example embodiment wherein the apparatus 100 functionality is implemented in a USB (Universal Serial Bus) modem 500. Consequently, the USB modem 500 comprises the set of the subscriber identity modules 110, 112, 114, 116, the interface 108 to the subscriber identity modules 110, 112, 114, 116, the at least one processor 106, and at least one memory 102 with the instructions 104.

The USB modem 500 may or may not comprise a battery, depending on the power requirements of the USB modem 500 and the possibility to obtain electric energy from an external source such as a mobile terminal 510.

Furthermore, the USB modem 500 comprises a USB interface 204 capable of being coupled 230 through a USB cable and appropriate connectors to a USB interface 220 of the mobile terminal 510. The data 142 relating to the mobile terminal 510 may be transferred from the mobile terminal 510 to the USB modem 500 through the interfaces 204, 220.

The instructions 104, when executed by the one or more processors 106 of the USB modem 500, cause the USB modem 500 to obtain the data 140A, 140B, 140C, 140D relating to the subscriber identity modules 110, 112, 114, 116, obtain the data 142 relating to the mobile terminal 510, obtain at least one selection ground 144 for the subscriber identity module, and select at least one optimal subscriber identity module 110, 112, 114, 116 for use by the mobile terminal 510 on the basis of the data 140A, 140B, 140C, 140D relating to the subscriber identity modules, the data 142 relating to the mobile terminal 510, and the at least one selection ground 144 for the subscriber identity module.

In an example embodiment, the mobile terminal 510 may be a portable computer, a tablet computer, or any other suitable mobile terminal capable of employing the set of subscriber identity modules 110, 112, 114, 116, but not necessarily itself including a transceiver capable of communicating with a wireless communication system, such as 702 illustrated in FIG. 7. Consequently, the mobile terminal 510 may only comprise the battery 212 and the user interface 216 of the other parts of the mobile terminal 210 illustrated in FIG. 2.

In the example embodiment of FIG. 5, the apparatus 100 functionality may be implemented in the USB modem 500 such that the instructions 104 are run in the at least one processor 106 of the USB modem 500. However, also such an example embodiment is feasible wherein a part of the apparatus 100 functionality is implemented in the mobile terminal 510 as well such that a part of the instructions 104 are also run in at least one processor 222 of the mobile terminal 510 besides the other instructions 224 stored in at least one memory 226 of the mobile terminal 510.

The example embodiments explained so far with reference to FIGS. 1 to 9 mainly deal with the selection of the at least one optimal subscriber identity module 110, 112, 114, 116 for use by the mobile terminal, wherein the processing relating to the selection is mainly done in the mobile terminal and/or in the accessory of the mobile terminal.

Figure 10:
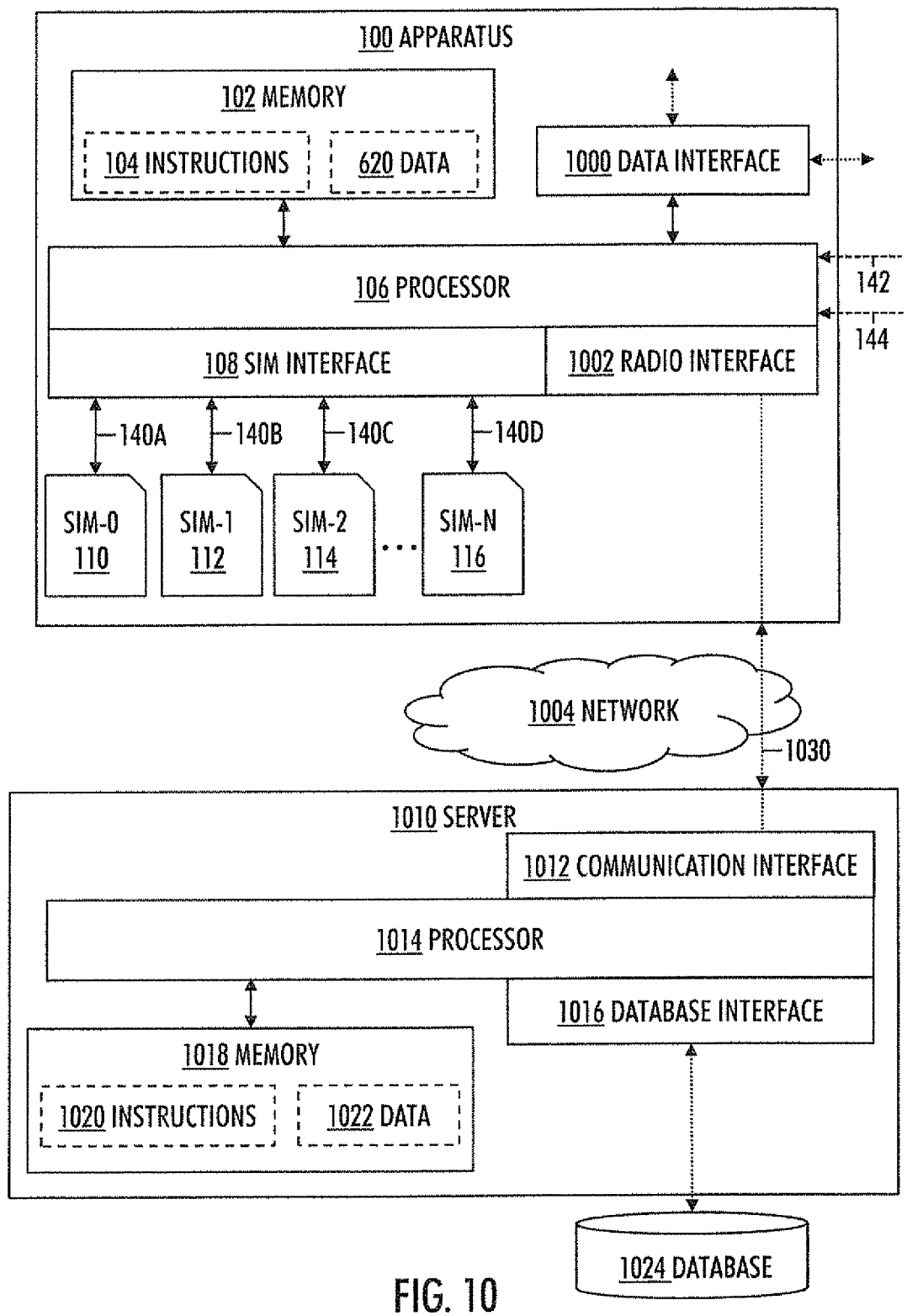
FIG. 10 illustrates example embodiments of an apparatus and a server.

FIG. 10 illustrates example embodiments, wherein an external server 1010 participates in said processing relating to the selection of the at least one optimal subscriber identity module 110, 112, 114, 116.

The apparatus 100 comprises, as already explained, the SIM interface 108 to the set of the subscriber identity modules 110, 112, 114, 116 of the wireless communication system. Furthermore, the apparatus 100 comprises a radio interface 1002 to a radio transceiver of a wireless communication system. The radio transceiver is not illustrated in FIG. 10, but it may be the radio transceiver 218 of the mobile terminal 210 as illustrated in FIG. 2, 3 or 4, or it may be the radio transceiver 216/218 of the USB modem 500 as illustrated in FIG. 5, for example. In fact, the apparatus 100 illustrated in FIG. 10 may be implemented as in any example embodiment described in FIGS. 1 to 9. These embodiments include a mobile wireless communications terminal, an accessory of a mobile wireless communications terminal, a combination of a mobile wireless communications terminal and an accessory of the mobile wireless communications terminal, an accessory of a mobile terminal, a combination of a mobile terminal and an accessory of the mobile terminal, a Universal Serial Bus USB modem. Consequently, the apparatus 100 may communicate 1030 with the server 1010 either through the accessory 200/300/500, which then includes a suitable transceiver 216/218, or through the mobile terminal 210/310/400/510, which includes a suitable transceiver 218.

The apparatus 100 further comprises the one or more processors 106, and the one or more memories 102 storing the instructions 104 as already explained earlier. The one or more memories 102 may further store the earlier mentioned data 620.

The instructions 104, when executed by the one or more processors 106, cause the apparatus 100 to obtain, through the SIM interface 108, data 140A, 140B, 140C, 140D relating to the subscriber identity modules 110, 112, 114, 116, and obtain data 142 relating to the mobile terminal 210/310/400/510.

Furthermore, the instructions 104, when executed by the one or more processors 106, cause the apparatus 100 to transmit, through the radio interface 1002, the data 140A, 140B, 140C, 140D relating to the subscriber identity modules 110, 112, 114, 116 and the data 142 relating to the mobile terminal 210/310/400/510 to the service provider server 1010, and receive, through the radio interface 1002, a selection from the service provider server 1010 of at least one optimal subscriber identity module 110/112/114/116 from among the set of the subscriber identity modules 110, 112, 114, 116 for use by the mobile terminal 210/310/400/510.

The server 1010 comprises a communication interface 1012 capable of communicating 1030 with the apparatus 100 through a communication network 1004. The communication network 1004 comprises at least a wireless system such as the earlier mentioned wireless communication system, but it may also comprise wired system, such as the Internet. Consequently, the communication interface 1012 utilizes either a radio transceiver and/or a wired network interface.

The server 1010 also comprises one or more processors 1014, and one or more memories 1018 storing instructions 1020. In an example embodiment, the server 1010 is a computer, such as a single server computer or a cluster of computers, whereby the one or more processors 104 and the one or more memories may be implemented by suitable processors, even in parallel or multicore embodiments, for example. As shown in FIG. 10, data 1022 relating to the processing may reside on the one or more memories 108. FIG. 10 also shows that the server 1010 may comprise a database interface 1016 to a database 1024 filled with information relating to the selection of optimal subscriber identity module. The database 1024 may reside in the server 1010, or, as illustrated in FIG. 10, in another computer.

In an example embodiment, the instructions 1020, when executed by the one or more processors 1014, cause the server 1010 to receive, through the communication interface 1012, the data 140A, 140B, 140C, 140D relating to the set of subscriber identity modules 110, 112, 114, 116 of the mobile terminal 210/310/400/510 of the wireless communication system, and data 142 relating to the mobile terminal 210/310/400/510.

In an example embodiment, the instructions 1020, when executed by the one or more processors 1014, cause the server 1010 to select at least one optimal subscriber identity module 110/112/114/116 for use by the mobile terminal 210/310/400/510 on the basis of the data 140A, 140B, 1400, 140D relating to the subscriber identity modules 110, 112, 114, 116, the data 142 relating to the mobile terminal 210/310/400/510, and at least one selection ground for the subscriber identity module.

With this kind of processing, utilization of many and wide range of subscriber identity modules becomes possible, and, furthermore, selection of the right subscriber identity module becomes user friendly and automatic. Besides, making the selection in the server 1010 enables the service provider to utilize the latest possible information relating to the selection grounds, whereby the selection is as optimal as possible. The centralized processing within the server 1010 enables the service provider to gather and combine data relating to a large number of users, whereby the information relating to the selection grounds may be interpreted more precisely.

In addition to selection of the at least one optimal subscriber identity module for use, i.e. what subscriber identity module to use, also the way to use the selected subscriber identity module(s) may be informed by the server 1010, i.e. how to use the subscriber identity module 110/112/114/116. A simple rule for use could be formulated as follows: "use the subscriber identity module 110 for web surfing, but for movie download use the subscriber identity module 112", but this is only an example embodiment, as the rule may be made much simpler but also much more complex.

As was explained earlier, the service provider may be an independent supplier/vendor of the subscriber identity modules 110, 112, 114, 116 and the apparatus 100. Also a mobile operator may take the role of the service provider. In any case, besides the subscriber identity modules supplied by the service provider, the user may also set own subscriber identity modules into the set of the subscriber identity modules among which the optimal one(s) is (are) selected.

The at least one selection ground comprises at least one of the following: network coverage criterion, available services criterion, quality of service criterion, costs of using the subscriber identity module criterion, location of the mobile terminal criterion. The server 1010 may gather real-life data relating to the selection grounds, and, as the processing is centralized, even confidential information may be utilized for the selection.

But, as was explained earlier, at least one selection ground 144 may also be obtained by the apparatus 100. Consequently, the one or more memories 102 further store instructions 104, that, when executed by the one or more processors 102, cause the apparatus 100 to obtain at least one selection ground 144 for the subscriber identity module, and transmit, through the radio interface 1002, the at least one selection ground 144 for the subscriber identity module to the service provider server 1010.

In an example embodiment, the instructions 1020, when executed by the one or more processors 1014, cause the server 1010 to transmit, through the communication interface 1012, the selection of at least one optimal subscriber identity module 110/112/114/116 from among the set of the subscriber identity modules 110, 112, 114, 116 for use by the mobile terminal 210/310/400/510.

As was explained earlier, in an example embodiment, the one or more memories 102 further store instructions 104, that, when executed by the one or more processors 106, cause the apparatus 100 to obtain the data 140A, 140B, 140C, 140D relating to the subscriber identity modules 110, 112, 114, 116 by at least one of the following: read the data from the subscriber identity modules 110, 112, 114, 116, receive the data from a user interface manipulated by a user of the mobile terminal 210/310/400/510.

As was also explained earlier, in an example embodiment, the one or more memories 102 further store instructions 104, that, when executed by the one or more processors 106, cause the apparatus 100 to obtain the data relating 142 to the mobile terminal 210/310/400/510 by at least one of the following: obtain location of the mobile terminal 210/310/400/510, obtain country code from the mobile terminal 210/310/400/ 510, obtain time from the mobile terminal 210/310/400/510, obtain date from the mobile terminal 210/310/400/510, obtain day of the week from the mobile terminal 210/310/ 400/510, obtain information of available operators from the mobile terminal 210/310/400/510, obtain information of available networks from the mobile terminal 210/310/400/ 510, obtain type of the mobile terminal 2101310/400/510, obtain model of the mobile terminal 210/310/400/510, obtain info about applications in use or used in the mobile terminal 210/310/400/510.

In an example embodiment, wherein the apparatus 100 further comprises a data interface 1000 to a user interface, and wherein the one or more memories 102 further store instructions 104, that, when executed by the one or more processors 106, cause the apparatus 100 to present, through the data interface 1000, the selection of the at least one optimal subscriber identity module 110/112/114/116 as pre-selected subscriber identity modules for the user, and to receive, through the data interface 1000, a confirmation/selection of at least one subscriber identity module 110/112/114/116 for use by the mobile terminal 210/310/400/510 from among the preselected subscriber identity modules.

Figure 8:
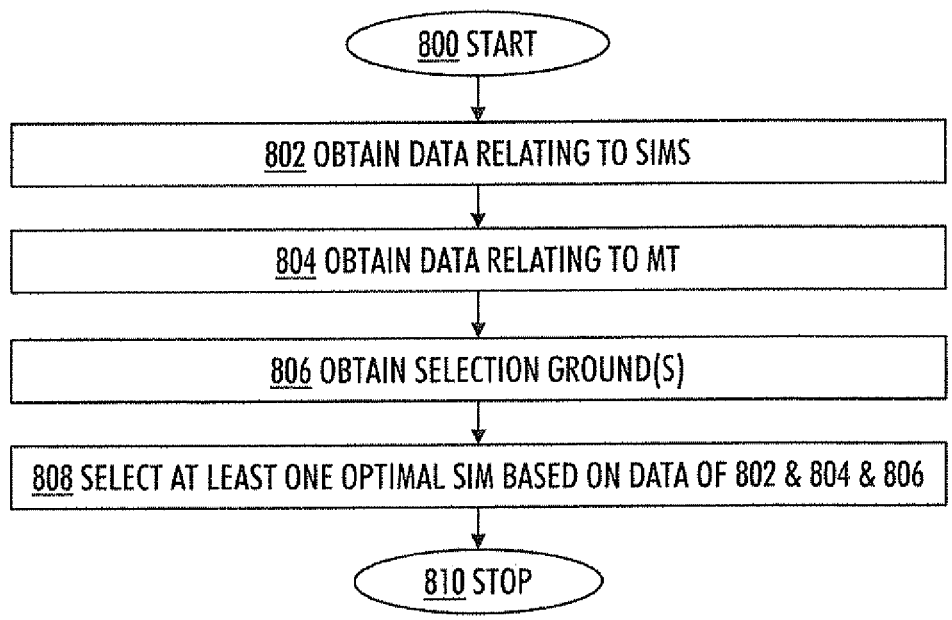
FIG. 8 illustrates example embodiments of a method.

Next, example embodiments of a method will be described with reference to FIG. 8. Other functions, not described in this application, may also be executed between the operations or within the operations. Some of the operations or parts of the operations may also be left out or replaced by a corresponding operation or part of the operation. The method starts in 800. In 802, data relating to subscriber identity modules of a wireless communication system is obtained. In 804, data relating to a mobile terminal is obtained. In 806, at least one selection ground for the subscriber identity module is obtained. It is to be noted that the sequence of operations 802, 804, 806 may differ from what is shown, and they may also be executed at least partly in parallel. In 808 at least one optimal subscriber identity module for use by the mobile terminal is selected on the basis of the data relating to the subscriber identity modules, the data relating to the mobile terminal, and the at least one selection ground for the subscriber identity module. The method ends in 810.

The embodiments of the earlier described apparatus 100 may also be used to enhance the method. In an example embodiment, the method may be implemented in an electronic apparatus 100 described earlier. In an embodiment, a computer program comprises instructions which, when loaded into an apparatus 100, cause the apparatus 100 to perform the described process. In an embodiment, a computer-readable storage medium comprises the computer program.

Next, further example embodiments of the method will be described. These example embodiments may be freely combined with each other in order to produce further example embodiments.

In an example embodiment, obtaining 802 the data relating to the subscriber identity modules comprises at least one of the following: reading the data from the subscriber identity modules; receiving the data wirelessly from a service provider; receiving the data from a user interface manipulated by a user of the mobile terminal.

In an example embodiment, obtaining 804 the data relating to the mobile terminal comprises at least one of the following: obtaining location of the mobile terminal; obtaining country code from the mobile terminal; obtaining time from the mobile terminal; obtaining date from the mobile terminal; obtaining day of the week from the mobile terminal; obtaining information of available operators from the mobile terminal; obtaining information of available networks from the mobile terminal; obtaining type of the mobile terminal, obtaining model of the mobile terminal; obtaining info about applications in use or used in the mobile terminal.

In an example embodiment, obtaining 806 the at least one selection ground for the subscriber identity module comprises at least one of the following: obtaining network coverage criterion; obtaining available services criterion; obtaining quality of service criterion; obtaining costs of using the subscriber identity module criterion; obtaining location of the mobile terminal criterion.

In an example embodiment, the method further comprises: treating one of the subscriber identity modules as the default subscriber identity module; and using the default subscriber identity module after start-up of the mobile terminal.

In an example embodiment, the method further comprises: detecting roaming of the mobile terminal; and initiating said selection of the at least one optimal subscriber identity module for use by the mobile terminal.

In an example embodiment, the method further comprises: detecting if the default subscriber identity module is taken out of the use and instead at least one more optimal subscriber identity module is taken into use, and, in such a case, switching on a call forwarding from the default subscriber identity module to one of the more optimal subscriber identity modules taken into use.

In an example embodiment, the method further comprises: performing said selection of the at least one optimal subscriber identity module for use by the mobile terminal in two stages, by pre-selecting subscriber identity modules that are usable on the basis of the data relating to the subscriber identity modules and the data relating to the mobile terminal, and by selecting at least one subscriber identity module for use by the mobile terminal from among the pre-selected subscriber identity modules on the basis of the at least one selection ground.

Figure 11:
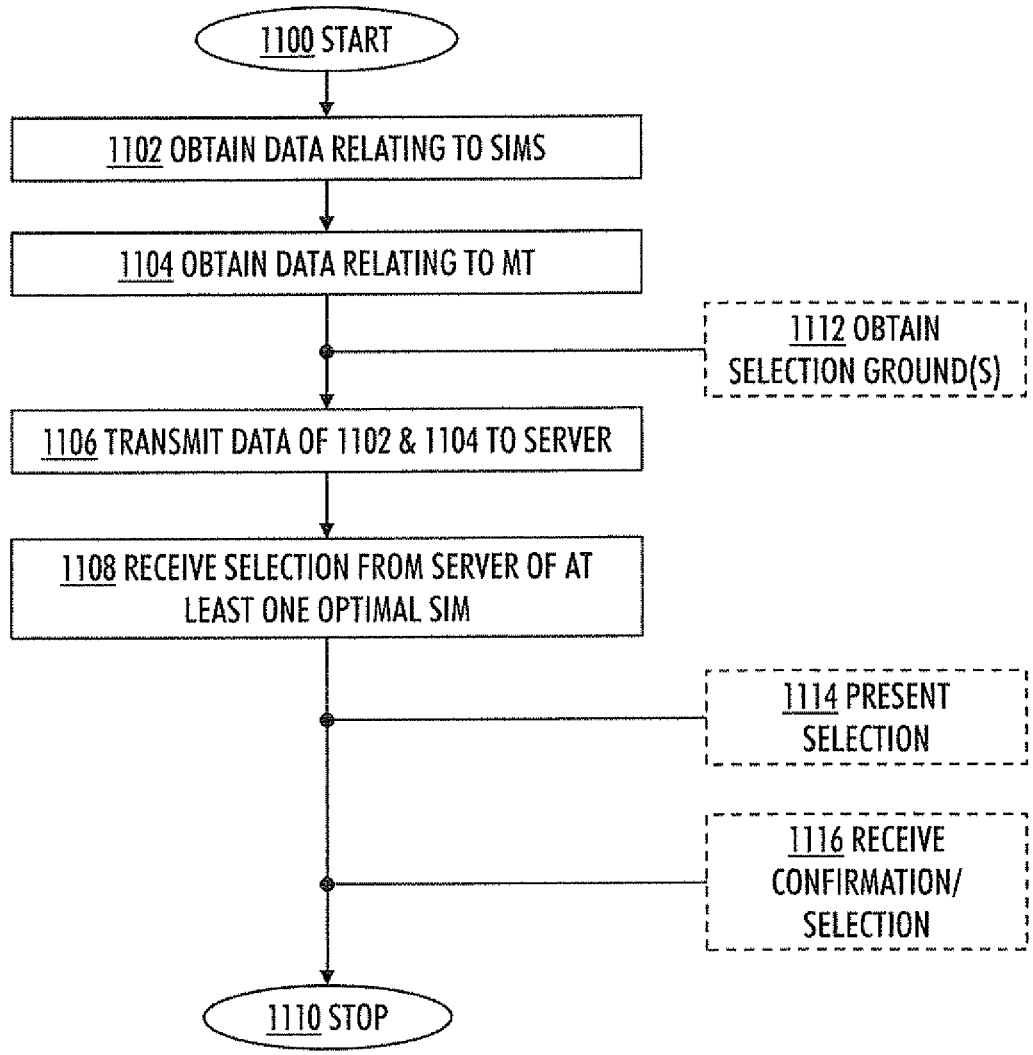
FIG. 11 illustrates example embodiments of a method.

FIG. 11 illustrates further example embodiments of the method. The method starts in 1100.

In 1102, data relating to subscriber identity modules of a wireless communication system is obtained. In an example embodiment, obtaining the data relating to the subscriber identity modules in 1102 comprises at least one of the following: reading the data from the subscriber identity modules, receiving the data from a user interface manipulated by a user of the mobile terminal.

In 1104, data relating to a mobile terminal is obtained. In an example embodiment, obtaining the data relating to the mobile terminal in 1104 comprises at least one of the following: obtaining location of the mobile terminal, obtaining country code from the mobile terminal, obtaining time from the mobile terminal, obtaining date from the mobile terminal, obtaining day of the week from the mobile terminal, obtaining information of available operators from the mobile terminal, obtaining information of available networks from the mobile terminal, obtaining type of the mobile terminal, obtaining model of the mobile terminal, obtaining info about applications in use or used in the mobile terminal.

In 1106, the data relating to the subscriber identity modules and the data relating to the mobile terminal is transmitted to a service provider server. In 1108, a selection is received from the service provider server of at least one optimal subscriber identity module from among the set of the subscriber identity modules for use by the mobile terminal. The method ends in 1110.

A further example embodiment includes an additional operation: in 1112, at least one selection ground for the subscriber identity module is obtained, and the at least one selection ground for the subscriber identity module is additionally transmitted in 1106 to the service provider server.

In another example embodiment, the method further comprises: presenting the selection of the at least one optimal subscriber identity module as pre-selected subscriber identity modules for the user in 1114, and receiving, from a user, a confirmation/selection of at least one subscriber identity module for use by the mobile terminal from among the pre-selected subscriber identity modules in 1116.

The previous embodiments have described an elaborated system of utilizing the set of the subscriber identity modules 110, 112, 114, 116 for the single user of the mobile terminal 210/310/400/510. Next, some further aspects relating to the management of the subscriber identity modules 110, 112, 114, 116 are revealed.

Figure 12:
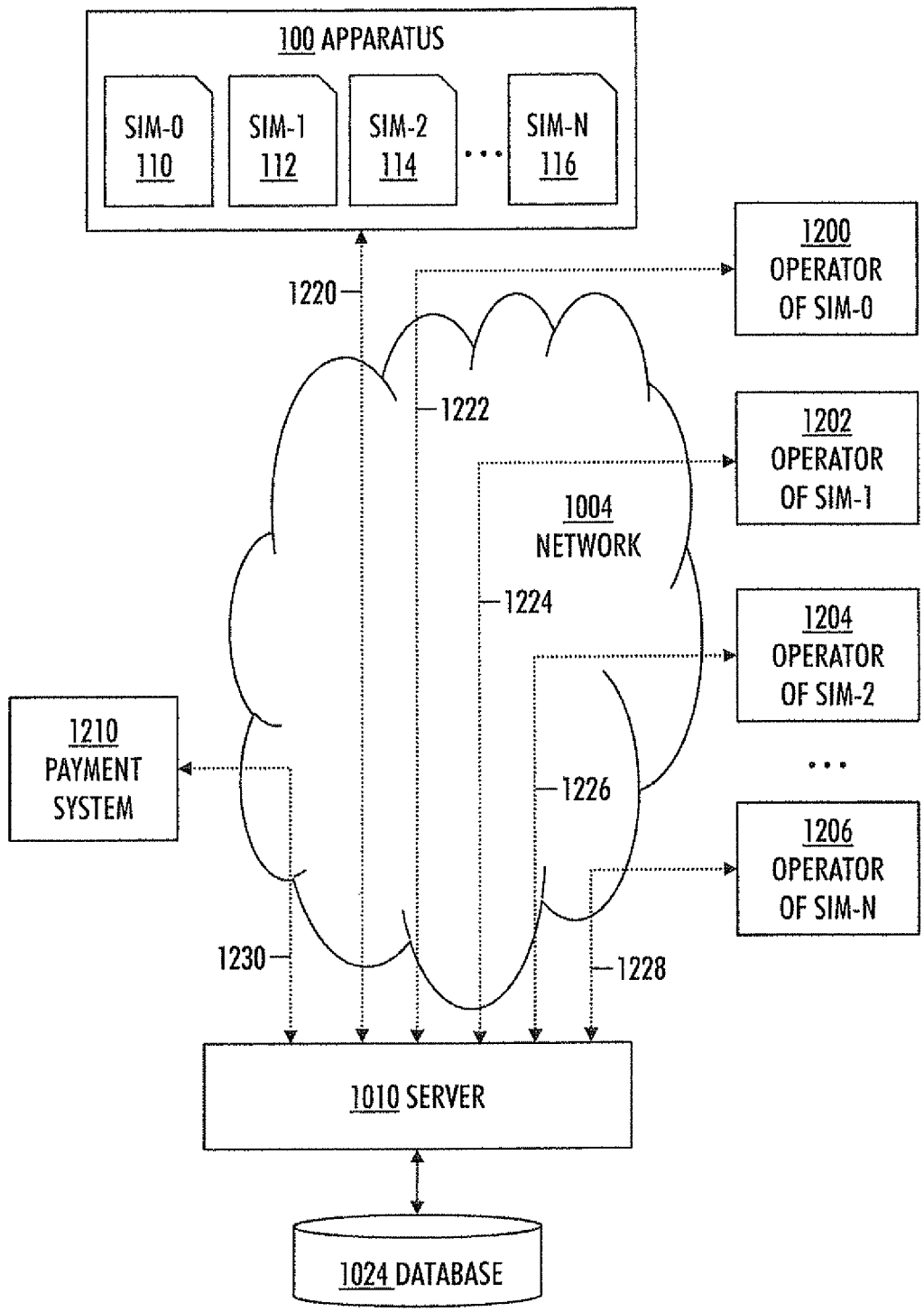

FIGS. 12 and 13 illustrate topping up of the subscriber identity modules 110, 112, 114, 116.

FIG. 12 illustrates the way the various parts of the system may interact with each other. It is to be noted that, for the sake of clarity, all possible connections between the various parts are not illustrated.

The apparatus 100 with the set of the subscriber identity modules 110, 112, 114, 116 illustrated in FIG. 12 is as in the example embodiments described earlier with reference to FIGS. 1 to 11.

Also the server 1010 and the database 1024 are as illustrated with the earlier described embodiments. The server 1010 may comprise at least one of the following: a computer, a server computer, a cluster of computers, a computer system, any one of the previous operated by a service provider providing the set of the subscriber identity modules 110, 112, 114, 116.

The communication network 1004 may comprise, as already explained a combination of various wireless and/or wired systems such as the earlier mentioned wireless communication system and the Internet.

As explained before, the server 1010 comprises the communication interface 1012, the one or more processors 1014, and the one or more memories 1018 storing the instructions 1020.

In an example embodiment, the instructions 1020, when executed by the one or more processors 1014, cause the server 1010, for each subscriber identity module 110, 112, 114, 116 belonging to the set of subscriber identity modules of the user of the mobile terminal 210/310/400/510, to detect 1220, 1222, 1224, 1226, 1228 a need to top up credit of the subscriber identity module 110/112/114/116, and after the detection, transmit, through the communication interface 1012, transaction data 1230 determining a payment to the mobile phone operator 1200, 1202, 1204, 1206 of the subscriber identity module 110/112/114/116 in order to top up the credit of the subscriber identity module 110/112/114/116. The need for the topping-up may be detected by the mobile phone operator infrastructure 1200, 1202, 1204, 1206, and/or by the subscriber identity module 110, 112, 114, 116 and the apparatus 100.

The mobile phone operator (also known as mobile network operator, wireless service provider, wireless carrier, cellular company, or mobile network carrier) 1200, 1202, 1204, 1206 is a telephone company providing services for the user of the mobile terminal 210/310/400/510. Some examples of the mobile phone operators include: China Mobile, Vodafone, Orange, TeliaSonera, T-Mobile, Verizon Wireless etc. The mobile phone operator 1200, 1202, 1204, 1206 gives the subscriber identity module 110, 112, 114, 116 to the user who inserts it into the apparatus 100 to gain access to the service. In the described embodiments, the mobile phone operators 1200, 1202, 1204, 1206 may first supply the service provider with at least some of the subscriber identity modules 110, 112, 114, 116, whereupon the service provider assembles a suitable set of the subscriber identity modules 110, 112, 114, 116, possibly with the apparatus 100, and gives them to the end-user for use. Other ways of supplying the subscriber identity modules 110, 112, 114, 116 to the end-user are also feasible: the service provider may give one or more subscriber identity modules 110, 112, 114, 116 to the end-user who will set them to the apparatus 100, for example. The mobile phone operator 1200, 1202, 1204, 1206 may either own the underlying network and spectrum assets required to run the service, or the mobile phone operator may be a virtual one, buying wholesale service from the mobile phone operator owning the underlying network and spectrum assets and selling on to its own customers. Even though connections between the subscriber identity modules 110, 112, 114, 116 and the operator infrastructure 1200, 1202, 1204, 1206 are not shown in FIG. 12, it is clear that such connections exist, as the subscriber identity modules 110, 112, 114, 116 remain, in general, under management of the operators; the service provider only supports their flexible use under varying circumstances.

In an example embodiment, the set of the subscriber identity modules 110, 112, 114, 116 comprises prepaid subscriber identity modules obtained from various mobile phone operators 1200, 1202, 1204, 1206. Credit is purchased in advance of use for the prepaid subscriber identity module. The purchased credit is used to pay for the services at the point they are used. If there is no credit left, the requested service is denied by the mobile network operator 1200, 1202, 1204, 1206. Topping-up of the credit is consequently needed in order to be able to use the network services. A variety of payment methods (including the use of bank accounts and/or credit cards) may be utilized for the topping-up.

As shown in FIG. 12, the server 1010 may transmit transaction data 1230 determining the payment to the mobile phone operator 1200, 1202, 1204, 1206 to a special payment system 1210. The payment system 1210 may be a part of a computer system of a bank, or another similar system capable of implementing financial transactions. Depending on the legislation and on the selected business model, the financial transactions relating to the topping-up may be performed in various ways. If the service provider maintaining the server 1010 is an independent supplier/vendor of the subscriber identity modules 110, 112, 114, 116, the service provider may first pay the topping-up for the mobile network operator and later charge it from the user. In such a case, the service provider acquires subscriber identity modules from various mobile phone operators 1200, 1202, 1204, 1206, and offers them as a convenient package (as the set) for the user, who may enjoy flexible roaming and reasonable costs as the optimal subscriber identity module 110/112/114/116 may be chosen for use depending on various earlier mentioned factors such as location, network coverage, cost, network quality, or any other parameter or their combination.

In the case of prepaid subscriber identity modules 110, 112, 114, 116, the mobile network operator 1200, 1202, 1204, 1206 is not necessarily using the most convenient payment methods due to the nature and/or features of the prepaid subscriber identity modules and its typical customer. This situation is improved by the service provider purchasing a large number of prepaid subscriber identity modules 110, 112, 114, 116 and acting as one billed customer towards the mobile network operator 1200, 1202, 1204, 1206, whereupon the service provider takes care of the individual billing towards the end-user.

In an example embodiment, the one or more memories 1018 further store instructions 1020, that, when executed by the one or more processors 1014, cause the server 1010 to determine the payment to the mobile phone operator 1200, 1202, 1204, 1206 to be paid from a bank account of the service provider providing the set of the subscriber identity modules 110, 112, 114, 116.

In another example embodiment, the one or more memories 1018 further store instructions 1020, that, when executed by the one or more processors 1014, cause the server 1010 to transmit, through the communication interface 1012, an invoice to the user covering the sum needed to top up the credit of the subscriber identity module 110/112/114/116. Such single topping-up results in smaller individual bills for the user. This is in contrast to the compiled invoicing described next.

In another example embodiment, the one or more memories 1018 further store instructions 1020, that, when executed by the one or more processors 1014, cause the server 1010 to compile user balance data from the balance data of each subscriber identity module 110, 112, 114, 116 belonging to the set of subscriber identity modules 110, 112, 114, 116.

In another example embodiment, the one or more memories 1018 further store instructions 1020, that, when executed by the one or more processors 1014, cause the server 1010 to transmit, through the communication interface 1012, a compiled invoice to the user covering the sum indicated by the user balance data. The compiled invoice simplifies the invoicing, both for the service provider and the user.

In an example embodiment, the one or more memories 1018 further store instructions 1020, that, when executed by the one or more processors 1014, cause the server 1010 to keep balance data 1022 relating to the subscriber identity module 110, 112, 114, 116, and detect the need to top up the credit of the subscriber identity module 110, 112, 114, 116 on the basis of the balance data 1022. In order to keep the balance data 1022, the server 1010 may itself process and store it in the database 1024, or the server 1010 may, alternatively, or additionally, receive the balance data 1022 from the mobile phone operator 1200, 1202, 1204, 1206. In an example embodiment, the one or more memories 1018 further store instructions 1020, that, when executed by the one or more processors 1014, cause the server 1010 to receive 1222, 1224, 1226, 1228, through the communication interface 1012, the balance data from the mobile phone operator 1200, 1202, 1204, 1206 of the subscriber identity module 110, 112, 114, 116.

Besides keeping the balance data, or in addition to it, the server 1010 may detect the need for the topping-up in other ways as well. In an example embodiment, the one or more memories 1018 further store instructions 1020, that, when executed by the one or more processors 1014, cause the server 1010 to receive 1222, 1224, 1226, 1228, through the communication interface 1012, a request from the mobile phone operator 1200, 1202, 1204, 1206 of the subscriber identity module 110, 112, 114, 116 to top up the credit, and detect the need to top up the credit of the subscriber identity module 110, 112, 114, 116 on the basis of the received request.

The topping-up of the credit may be performed automatically, without any user action, or semi-automatically with some user interaction.

In an example embodiment, the one or more memories 1018 further store instructions 1020, that, when executed by the one or more processors 1014, cause the server 1010 to, after the detection, decide automatically to top up the credit of the subscriber identity module 110/112/114/116.

In another example embodiment, the one or more memories 1018 further store instructions 1020, that, when executed by the one or more processors 1014, cause the server 1010 to, after the detection, transmit 1220, through the communication interface 1012, alarm data to the user informing of the need to top up the credit of the subscriber identity module 110/112/114/116. Such alarming may be performed just to inform the user that the topping-up is needed, i.e. the topping-up is still performed automatically. Or, alternatively, user interaction is required, whereupon in a further example embodiment, the one or more memories 1018 further store instructions 1020, that, when executed by the one or more processors 1014, cause the server 1010 to receive 1220, through the communication interface 1012, in response to the alarm data, instructions from the user instructing to top up the credit of the subscriber identity module 110/112/114/116.

FIG. 13 illustrates an example embodiment of a service provider table representing possible contents of the database 1024. For each user (=user of the subscriber identity modules) 1320, 1322, 1324, the table has one row with various columns. It is to be noted that this table does not reflect the accurate database structure, but merely an outline of the information.

User column 1300 includes the name of the user 1300.

User info column 1302 includes various information of the user.

Invoicing info column 1304 includes various information relating to the invoicing such as credit card number, billing address, account balance etc.

For each subscriber identity module of the user there is at least one column 1306, 1308, 1310, 1312, 1314 including various information relating to the subscriber identity module 110, 112, 114, 116 such as SIM number, tariff, preferred area, other network info, operator info, balance of account (in minutes or in money).

Total info column 1316 includes various summary information such as number of cards, usage of SIM cards, total time, usage over time, other statistics.

Forecasting column 1318 includes forecasts for the user such as a forecast of SIM usage over time.

Additionally, the table has at least two summary rows: total info row 1330, and forecasting row 1340.

Total info row 1330 includes various summary information of all users such as number of cards, usage of SIM cards, total time, usage over time, other statistics.

Forecasting row 1340 includes forecasts for all users such as a forecast of SIM usage over time.

FIGS. 14A and 14B illustrate example embodiments relating to analysis, prediction and action on use of the subscriber identity module. These example embodiments may be enhanced with the details of the other example embodiments disclosed in FIGS. 1 to 13.

In an example embodiment of the server 1010, the instructions 1020, when executed by the one or more processors 1014, cause the server 1010, for each subscriber identity module 110, 112, 114, 116 belonging to the set of subscriber identity modules of the user of the mobile terminal 210/310/400/510, to cause an analysis on use of the subscriber identity module 110/112/114/116, cause a prediction of a future activity status change of the subscriber identity module 110/112/114/116 on the basis of the analysis, and cause an action affecting the activity status of the subscriber identity module 110/112/114/116 on the basis of the prediction.

Let us study FIG. 14A illustrating an example embodiment of a service provider table representing possible contents of the database 1024 for one single user of the subscriber identity modules 1430, 1432, 1434, 1436. For each subscriber identity module 1430, 1432, 1434, 1436, the table has one row with various columns. It is to be noted that this table does not reflect the accurate database structure, but merely an outline of the information.

The user has four subscriber identity modules, one for each area 1400: the subscriber identity module 1430 for Finland (FIN), the subscriber identity module 1432 for Germany (DE), the subscriber identity module 1434 for France (FR), and the subscriber identity module 1436 for Great Britain (GB).

The subscriber identity modules have the following labels 1402: SIM1=FIN SIM 1430, SIM2=DE SIM 1432, SIM3=FR SIM 1434, and GB SIM 1436 is to be delivered (TBD) to the user.

Status 1404 of the subscriber identity module is maintained: FIN SIM 1430 is in use, DE SIM 1432 is in use, FR SIM 1434 has not yet been activated, and as GB SIM 1436 has not yet been delivered, it does not have a usage status either.

Furthermore, the table includes the following information: balance (of subscriber identity module user account) 1406, use as minutes/day 140B, and use as megabytes/day 1410. The marking "NO, AVG" means that as there is no data available, an average (of all users/a subset of users/the user in question) is used.

The present and future 1422 use of each subscriber identity module 1430, 1432, 1434, 1436 of the user is shown on the right side of the table. In the example embodiment of FIG. 14A, months 1412, 1414, 1416, 1418, 1420 from January to May are shown, but also other suitable time measurement units such as minutes, hours, days, weeks, years etc. may be used for processing/displaying the information.

Let us suppose that the analysis on use of each subscriber identity module 1430, 1432, 1434, 1436 has been performed. The analysis may be performed on the past use and/or the present use.

The horizontal line pattern shows a prediction of future activity status for each subscriber identity module 1430, 1432, 1434, 1436. The horizontal line pattern means that it is predicted that the user will use the subscriber identity module 1430, 1432, 1434, 1436: FIN SIM 1430 will be in use from January to May, DE SIM 1432 will be used in February and May, FR SIM 1434 will be used in April, and GB SIM 1436 will be in use in May. Such prediction may be based on history information and/or on information obtained from the user on future use, such information may include future travel plans, for example.

FIG. 14B illustrates the same table as FIG. 14A, but with a slightly different view on its contents. The present and future 1422 are shown on the far right, but history 1424 is now shown in the middle: minutes and megabytes for July 1442 and minutes and megabytes for August 1444 of the previous year are shown, but months from September 1426 to December of the previous year are hidden as the window in which the history 1424 is shown is scrollable.

If there is a change in the future activity status of the subscriber identity module 1430, 1432, 1434, 1436, an action affecting the activity status of the subscriber identity module 1430, 1432, 1434, 1436 is performed.

As shown in FIG. 14B, no actions are necessary for the FIN SIM 1430 as its use will continue as usual.

Regarding the DE SIM 1432, the analysis shows that it has not been in use in six months 1450, i.e. from July 1442 to December, and the prediction is that a future activity status change will happen, i.e. DE SIM 1432 will be taken out of use by the operator due to this period of no use. Accordingly, an action 1452 affecting the activity status becomes necessary, i.e. an updating action 1452 that keeps the DE SIM 1432 in use. One way of achieving this is by performing an action 1452 that ends the period of no use 1450 before the operator takes the DE SIM 1432 out of use.

In an example embodiment, the action 1452 affecting the activity status of the subscriber identity module 1432 on the basis of the prediction comprises at least one of the following:
cause a top up of the credit of the subscriber identity module 1432 in order to keep the subscriber identity module 1432 alive;
cause a phone call with the subscriber identity module 1432 in order to keep the subscriber identity module 1432 alive;
cause a phone call to the subscriber identity module 1432 in order to keep the subscriber identity module 1432 alive;
cause a data transfer with the subscriber identity module 1432 in order to keep the subscriber identity module alive 1432.

As the action 1452 is only needed in order to keep the SIM 1432 alive, the phone call may be of minimal duration such as 0.1 seconds, as well as the data transfer may handle a minimal amount of data such as 1 kilobytes. Furthermore, even the top up of the credit may be of a minimal money amount such as 0.01 €.

Regarding the FR SIM 1434, the analysis shows that the user is planning to take it into use in March 1416, which results in a prediction stating that a future activity status change is needed in March 1416, whereupon an action 1454 changing the activity status of FR SIM 1434 from "NOT ACTIVATED" to "IN USE" is performed before March.

In an example embodiment, the action 1454 affecting the activity status of the subscriber identity module 1434 on the basis of the prediction comprises: cause a top up of the credit of the subscriber identity module 1434 in order to take the subscriber identity module 1434 into use.

Regarding the FR SIM 1434, the analysis also shows that the FR SIM 1434 needs to activated before the end of May 1420. In an example embodiment, the action 1456 affecting the activity status of the subscriber identity module 1434 on the basis of the prediction comprises: cause an activation 1456 of the subscriber identity module 1434 before an expiry of a time limit for the activation in order to keep the subscriber identity module 1434 alive.

Regarding the GB SIM 1436, the analysis shows that nothing will happen, and, consequently, no actions are necessary for the time being.

In some cases, such as with use of prepaid SIM cards, the SIM card may be going out of date. In a further example embodiment, the action affecting the activity status of the subscriber identity module on the basis of the prediction comprises: cause an order of a new subscriber identity module in order to replace the subscriber identity module that is about to expire.

The actions described so far may be performed automatically. The term 'automatic' refers to the fact that the server 1010 performs its tasks autonomously, self-acting, and/or without an external motive force. This is opposite to such an operation where the user of the subscriber identity modules 110/112/114/116, 1430/1432/1434/1436 has to take care of the actions. Even if the embodiments operate automatically in this respect, it is not excluded that the user may perform a confirmation operation or operations. Consequently, the server 1010 may be configured to perform the selection automatically, without the user interacting with a user interface, or semi-automatically, the user accepting a user profile suggested in the user interface. In an example embodiment, the one or more memories 1018 further store instructions 1020, that, when executed by the one or more processors 1014, cause the server 1010 to: cause transmission 1220 of alarm data to the user informing of the predicted future activity status change of the subscriber identity module 110/112/114/116, 1430/1432/1434/1436. In an example embodiment, the one or more memories 1018 further store instructions 1020, that, when executed by the one or more processors 1014, cause the server 1010 to: cause reception 1220, in response to the alarm data, of instructions from the user authorizing the action affecting the activity status of the subscriber identity module 110/112/114/116, 1430/1432/1434/1436.

Figure 15:
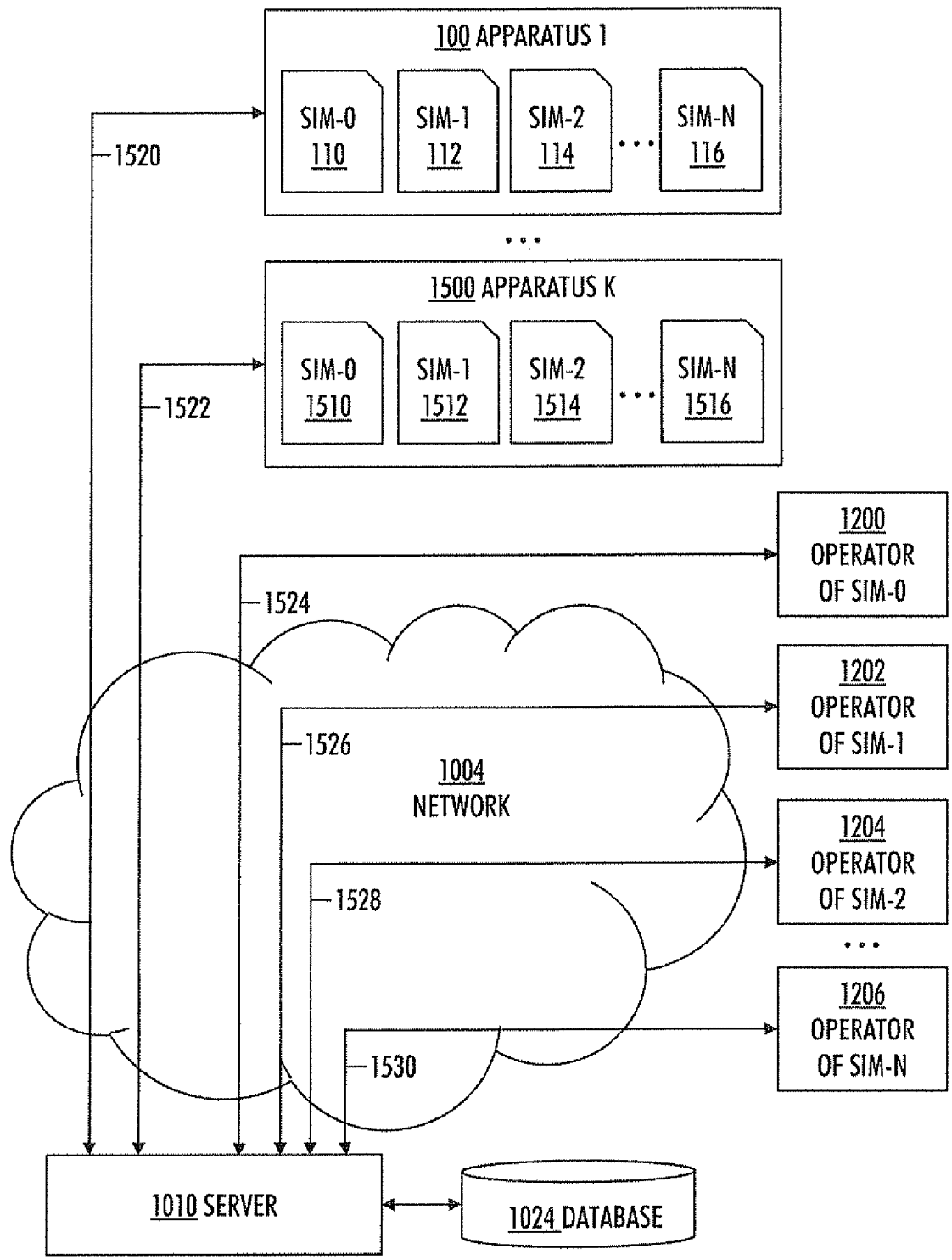
FIG. 15 illustrates further example embodiments of the server.

Next, with reference to FIG. 15, let us study some further aspects relating to the selection of the optimal subscriber identity module for use by the mobile terminal 210/310/400/510. Now, there is a plurality of users of mobile terminals 210/310/400/510, and, accordingly, a plurality of apparatuses 100, 1500, each apparatus 100, 1500 employing a set of subscriber identity modules 110, 112, 114, 116, 1510, 1512, 1514, 1516. The number of the apparatuses 100, 1500 may be K, wherein K is an integer greater than one.

As was already explained with reference to FIGS. 14A and 14B, the use of the subscriber identity modules may be analyzed and predicted. However, in the following embodiments, analysis, prediction, and selection are performed simultaneously for a plurality of users of mobile terminals. The aim is, instead of optimizing the use of the subscriber identity modules for one user only, to optimize the use of the subscriber identity modules for the plurality of the users of the mobile terminals. The plurality of the users to whom the optimization is directed may be a mixed group of users, but it may well be a specific group of people such as a school class, a fan club of a sports club (in a specific match), a group of corporate users etc. In an example embodiment, the service provider, and/or the operators may offer a specially allocated and tailored service for the group. In an example embodiment, the one or more memories 1018 further store instructions 1020, that, when executed by the one or more processors 1014, cause the server 1010, for the plurality of the users of the mobile terminals 210/310/400/510, to cause offering a specially allocated and tailored service for use by the mobile terminal 210/310/400/510 such that the use of the subscriber identity modules is optimized for the plurality of the users of the mobile terminals as regards to the specially allocated and tailored service. Such special user group may utilize a plurality of different operator resources for its tailored service.

The server 1010 comprises one or more processors 1014, and one or more memories 1018 storing instructions 1020. The instructions 1020, when executed by the one or more processors 1014, cause the server 1010, to perform the following sequence of four operations.

First, for the plurality of the users of the mobile terminals 210/310/400/510, the instructions 1020 cause the server 1010 to cause an analysis on use of each subscriber identity module 110, 112, 114, 116, 1510, 1512, 1514, 1516 belonging to a set of subscriber identity modules of a user of a mobile terminal 210/310/400/510.

Second, for the plurality of the users of the mobile terminals 210/310/400/510, the instructions 1020 cause the server 1010 to cause a prediction of a future use of the each subscriber identity module 110, 112, 114, 116, 1510, 1512, 1514, 1516 belonging to the set on the basis of the analysis.

Third, for the plurality of the users of the mobile terminals 210/310/400/510, the instructions 1020 cause the server 1010 to cause selection of at least one optimal subscriber identity module 110/112/114/116, 1510/1512/1514/1516 for use by the mobile terminal 210/310/400/510 on the basis of the prediction such that the use of the subscriber identity modules is optimized for the plurality of the users of the mobile terminals.

Fourth, for the plurality of the users of the mobile terminals 210/310/400/510, the instructions 1020 cause the server 1010 to cause a transmission 1520, 1522 of the selection of at least one optimal subscriber identity module 110/112/114/116, 1510/1512/1514/1516 from among the set of the subscriber identity modules for use by the mobile terminal 210/310/400/510.

The four-phase sequence may be augmented by the embodiments described earlier as regards to the selection of the optimal subscriber identity module 110/112/114/116, 1510/1512/1514/1516 from among the set of the subscriber identity modules for use by the mobile terminal 210/310/400/510.

In an example embodiment, the one or more memories 1018 further store instructions 1020, that, when executed by the one or more processors 1014, cause the server 1010, for the plurality of the users of the mobile terminals 210/310/400/510, to cause acquisition 1520, 1522 of data on use of each subscriber identity module 110, 112, 114, 116, 1510, 1512, 1514, 1516 belonging to a set of subscriber identity modules of a user of a mobile terminal 210/310/400/510 by at least one of the following:

obtain location of the mobile terminal 210/310/400/510;

obtain country code from the mobile terminal 210/310/400/510;

obtain time from the mobile terminal 210/310/400/510;

obtain date from the mobile terminal 210/310/400/510;

obtain day of the week from the mobile terminal 210/310/400/510;

obtain information of available operators from the mobile terminal 210/310/400/510;

obtain information of available networks from the mobile terminal 210/310/400/510;

obtain type of the mobile terminal 210/310/400/510;

obtain model of the mobile terminal 210/310/400/510;

obtain info about applications in use or used in the mobile terminal 210/310/400/510.

In an example embodiment, the one or more memories 1018 further store instructions 1020, that, when executed by the one or more processors 1014, cause the server 1010, for the plurality of the users of the mobile terminals 210/310/400/510, to cause the selection of the at least one optimal subscriber identity module for use by the mobile terminal on the basis of the prediction such that the use of the subscriber identity modules is optimized for the plurality of the users of the mobile terminals, and on the basis of at least one selection ground comprising at least one of the following:

network coverage criterion;

available services criterion;

quality of service criterion;

costs of using the subscriber identity module criterion;

location of the mobile terminal criterion.

The exact nature of the optimization may vary. The optimization may be mainly based on one parameter only, or, the optimization may be based on at least two different parameters. The optimization parameters may be weighted in relation to each other. The optimization parameters may include load of the network serving the subscriber identity modules 110, 112, 114, 116, 1510, 1512, 1514, 1516, and/or costs of using the subscriber identity modules 110, 112, 114, 116, 1510, 1512, 1514, 1516.

In an example embodiment, the one or more memories 1018 further store instructions 1020, that, when executed by the one or more processors 1014, cause the server 1010, for the plurality of the users of the mobile terminals 210/310/400/510, to cause the selection of the at least one optimal subscriber identity module 110/112/114/116, 1510/1512/1514/1516 for use by the mobile terminal 210/310/400/510 on the basis of the prediction such that the use of the subscriber identity modules is optimized for the plurality of the users of the mobile terminals as regards to the load of the network serving the subscriber identity modules. The network capacity is usually limited, but free capacity may be sporadically available depending on time and/or location, for example. However, a single user is not capable of utilizing the free capacity, but the service provider operating the server 1010 may be able to utilize the free capacity due to its knowledge of the current overall usage situation. Consequently, the service provider may find an optimization on the level of the plurality of the mobile terminal users, whereby the free capacity of the network is better utilized. The service provider may even perform the optimization in an inter-operator level, not just necessarily in a single operator level. The operator may be more willing to optimize the usage of the network due to the fact that there may be more users sharing common views/goals, or even special user groups, as opposed to the situation where only single users without a common denominator are present.

In another example embodiment, the one or more memories 1018 further store instructions 1020, that, when executed by the one or more processors 1014, cause the server 1010, for the plurality of the users of the mobile terminals 210/3101400/510, to cause the selection of the at least one optimal subscriber identity module 110/112/114/116, 1510/1512/1514/1516 for use by the mobile terminal 210/310/400/510 on the basis of the prediction such that the use of the subscriber identity modules is optimized for the plurality of the users of the mobile terminals as regards to the costs of using the subscriber identity modules 110/112/114/116, 1510/1512/1514/1516.

In an example embodiment, the one or more memories 1018 further store instructions 1020, that, when executed by the one or more processors 1014, cause the server 1010 to cause automatic tendering 1524, 1526, 1528, 1530 from various mobile phone operators 1200, 1202, 1204, 1206 for costs of using the subscriber identity modules 110, 112, 114, 116, 1510, 1512, 1514, 1516 for the plurality of the users of the mobile terminals 210/310/400/510.

In an example embodiment, the one or more memories 1018 further store instructions 1020, that, when executed by the one or more processors 1014, cause the server 1010 to cause automatic tendering 1524, 1526, 1528, 1530 from various mobile phone operators 1200, 1202, 1204, 1206 for quality of service of using the subscriber identity modules 110, 112, 114, 116, 1510, 1512, 1514, 1516 for the plurality of the users of the mobile terminals 210/310/400/510.

In an example embodiment, the one or more memories 1018 further store instructions 1020, that, when executed by the one or more processors 1014, cause the server 1010 to cause automatic tendering 1524, 1526, 1528, 1530 from various mobile phone operators 1200, 1202, 1204, 1206 for using the subscriber identity modules 110, 112, 114, 116, 1510, 1512, 1514, 1516 for the plurality of the users of the mobile terminals 210/310/400/510 terminals with higher speed and/or capacity at the same price than before.

In an example embodiment, the set of the subscriber identity modules 110, 112, 114, 116, 1510, 1512, 1514, 1516 comprises prepaid subscriber identity modules obtained from various mobile phone operators 1200, 1202, 1204, 1206.

Automatic tendering refers to the acquisition process of the network capacity from the operators 1200, 1202, 1204, 1206 by the service provider. The service provider may ask the operators to 1200, 1202, 1204, 1206 to bid the cost of the service they are willing to provide for the users of the subscriber identity modules 110, 112, 114, 116, 1510, 1512, 1514, 1516. The tender may include the price, the quality of service, location, schedule, and other relevant parameters relating to the use. The service provider will usually select the lowest bidder fulfilling the requirements. The service provider may ask the operators to offer discount or, alternatively, better service at the same price than before. The better service may include higher data transmission speed and/or higher capacity. The discount or better service may be requested for time being, or for a limited period of time starting immediately or in the future. In a way, the service provider acts as a broker between the operators seeking best deals for the mobile terminal users, but at the same time optimizing the network usage of the mobile operators 1200, 1202, 1204, 1206 as well.

The present invention is applicable to apparatuses defined above but also to other suitable apparatuses. The protocols used, the specifications of wireless communication systems, and the apparatuses develop rapidly. Such development may require extra changes to the described example embodiments. Therefore, all words and expressions should be interpreted broadly and they are intended to illustrate, not to restrict, the example embodiments. It will be obvious to a person skilled in the art that, as technology advances, the inventive concept can be implemented in various ways. The invention and its embodiments are not limited to the examples described above but may vary within the scope of the claims.

The invention claimed is:

1. A server comprising:
   one or more processors, and
   one or more memories storing instructions, that, when executed by the one or more processors, cause the server, to:
   for a group comprising a plurality of users of mobile terminals, wherein each user of the plurality of users is associated with a mobile terminal and each mobile terminal comprises plural subscriber identity modules, cause offering a specially allocated and tailored service for use by the mobile terminals such that the use of the subscriber identity modules is optimized for the plurality of the users of the mobile terminals as regards to the specially allocated and tailored service, wherein the offering comprises:
      for the plurality of the mobile terminals, cause an analysis on use of each subscriber identity module belonging to a set of the subscriber identity modules of a user of a mobile terminal;
      for the plurality of the mobile terminals, cause a prediction of a future use of the each subscriber identity module belonging to the set on the basis of the analysis;
      for the plurality of the mobile terminals, select at least one optimal subscriber identity module for use by the mobile terminal on the basis of the prediction such that the use of the subscriber identity modules is optimized for the plurality of the mobile terminals simultaneously as regards to a load of a network serving the selected subscriber identity modules of the group;

for the plurality of the mobile terminals, cause a transmission of the selection of at least one optimal subscriber identity module from among the set of the subscriber identity modules for use by the mobile terminal; and cause automatic tendering from a plurality of mobile phone operators for the specially allocated and tailored service of the group by at least one of the following:

cause automatic tendering from the plurality of mobile phone operators for costs of using the subscriber identity modules for the plurality of the mobile terminals;

cause automatic tendering from the plurality of mobile phone operators for quality of service of using the subscriber identity modules for the plurality of the mobile terminals; and cause automatic tendering from the plurality of mobile phone operators for using the subscriber identity modules for the plurality of the mobile terminals with at least one of higher speed and capacity at a same previously provided price.

2. The server of claim 1, wherein the one or more memories further store instructions, that, when executed by the one or more processors, cause the server to:

for the plurality of the mobile terminals, cause acquisition of data on use of each subscriber identity module belonging to a set of subscriber identity modules of a user of a mobile terminal by at least one of the following:

obtain location of the mobile terminal;
obtain country code from the mobile terminal;
obtain time from the mobile terminal;
obtain date from the mobile terminal;
obtain day of the week from the mobile terminal;
obtain information of available operators from the mobile terminal;
obtain information of available networks from the mobile terminal;
obtain type of the mobile terminal;
obtain model of the mobile terminal;
obtain info about applications in use or used in the mobile terminal.

3. The server of claim 1, wherein the one or more memories further store instructions, that, when executed by the one or more processors, cause the server to:

for the plurality of the mobile terminals, cause the selection of the at least one optimal subscriber identity module for use by the mobile terminal on the basis of the prediction such that the use of the subscriber identity modules is optimized for the plurality of the users of the mobile terminals, and on the basis of at least one selection ground comprising at least one of the following:

network coverage criterion;
available services criterion;
quality of service criterion;
costs of using the subscriber identity module criterion;
location of the mobile terminal criterion.

4. The server of claim 1, wherein the one or more memories further store instructions, that, when executed by the one or more processors, cause the server to:

for the plurality of the mobile terminals, cause the selection of the at least one optimal subscriber identity module for use by the mobile terminal on the basis of the prediction such that the use of the subscriber identity modules is optimized for the plurality of the users of the mobile terminals as regards to the load of the network serving the subscriber identity modules.

5. The server of claim 1, wherein the one or more memories further store instructions, that, when executed by the one or more processors, cause the server to:

for the plurality of the mobile terminals, cause the selection of the at least one optimal subscriber identity module for use by the mobile terminal on the basis of the prediction such that the use of the subscriber identity modules is optimized for the plurality of the users of the mobile terminals as regards to the costs of using the subscriber identity modules.

6. The server of claim 1, wherein the set of the subscriber identity modules comprises prepaid subscriber identity modules obtained from various mobile phone operators.

7. The server of claim 1, wherein the mobile terminal comprises at least one of the following: a mobile wireless communications terminal, an accessory of a mobile wireless communications terminal, a combination of a mobile wireless communications terminal and an accessory of the mobile wireless communications terminal, and a Universal Serial Bus USB modem.

8. The server of claim 1, wherein the server comprises at least one of the following: a computer, a server computer, a cluster of computers, a computer system, any one of the previous operated by a service provider providing the set of the subscriber identity modules.

9. The server of claim 1, wherein the selection of the at least one optimal subscriber identity module for use by the mobile terminal identifies the at least one subscriber identity module to use by the mobile terminal.

10. The server of claim 1, wherein the specially allocated and tailored service comprises at least one of a mixed group of users, a specific group of people, a school class, a fan club of a sports club, or a group of corporate users.

\* \* \* \* \*